(12) United States Patent
Sawada et al.

(10) Patent No.: US 7,875,414 B2
(45) Date of Patent: Jan. 25, 2011

(54) CYCLIC STRUCTURE FORMATION METHOD AND SURFACE TREATMENT METHOD

(75) Inventors: Hiroshi Sawada, Kusatsu (JP); Kou Kurosawa, Miyazaki (JP)

(73) Assignee: Canon Machinery Inc., Shiga-Ken (JP)

( * ) Notice: Subject to any disclaimer, the term of this patent is extended or adjusted under 35 U.S.C. 154(b) by 860 days.

(21) Appl. No.: 10/529,376

(22) PCT Filed: Sep. 25, 2003

(86) PCT No.: PCT/JP03/12308

§ 371 (c)(1), (2), (4) Date: Sep. 20, 2005

(87) PCT Pub. No.: WO2004/035255

PCT Pub. Date: Apr. 29, 2004

(65) Prior Publication Data

US 2006/0138102 A1    Jun. 29, 2006

(30) Foreign Application Priority Data

Sep. 27, 2002 (JP) ............... 2002-283954
Nov. 27, 2002 (JP) ............... 2002-344478

(51) Int. Cl.
G02B 6/34    (2006.01)
H01L 21/00    (2006.01)

(52) U.S. Cl. ............... 430/269; 430/290; 438/31; 438/32; 385/132; 148/565; 264/1.37

(58) Field of Classification Search ............... 219/121.6, 219/121.66, 121.69, 121.85; 438/32, 669, 438/29, 31; 359/569; 264/400; 216/65; 430/269, 290, 945; 148/565; 385/132; 65/102, 65/106; 398/34, 87

See application file for complete search history.

(56) References Cited

U.S. PATENT DOCUMENTS 4,793,680 A * 12/1988 Byron .................. 385/37

(Continued)

FOREIGN PATENT DOCUMENTS

JP    59-165428    9/1984

(Continued)

OTHER PUBLICATIONS

"Incident-Angle Dependency of Laser-induced Surface Ripples on Metals and Semiconductors" by Yukimasa Minami et al. / Dec. 2000 Review of Laser Engineering vol. 28, No. 12 / pp. 824-828 / http://wwwsoc.nii.ac.jp/lsj/abstract/2000/V28No12_824.html.
"Fabrication of Micro-Gratings on Inorganic Materials by Two-Beam Holographic Method Using Infrared Femtosecond Laser Pulses" by Ken-Ichi et al. / May 2002 Review of Laser Engineering vol. 30, No. 5 / pp. 244-250 http://wwwsoc.nii.ac.jp/lsj/abstract/2002/V30No05_0244.html.

(Continued)

Primary Examiner—Samuel M Heinrich
(74) Attorney, Agent, or Firm—J.C. Patents

(57) ABSTRACT

A periodic structure is to be successively formed over an extensive area with a uniaxial laser beam. Such method includes irradiating a uniaxial laser beam near an ablation threshold to a surface of a material; and executing an overlapped scanning on the irradiated region, so as to cause an ablation by interference between an incident beam and a surface scattered wave along the material surface; increasing the scattered wave; causing an interference at an interval equal to a wavelength of the laser beam, to thereby cause spontaneous formation of a periodic structure. The periodic structure can be made to have a different ripple spacing by changing an incident angle of the laser beam to the material surface. When the laser incident beam has an angle, the ripple spacing can be changed by changing a scanning direction.

13 Claims, 20 Drawing Sheets

U.S. PATENT DOCUMENTS

| | | | |
|---|---|---|---|
| 5,072,091 A | 12/1991 | Nagata et al. | 219/121.68 |
| 5,417,896 A * | 5/1995 | Fischer et al. | 264/400 |
| 5,436,192 A * | 7/1995 | Epler et al. | 438/32 |
| 5,558,789 A * | 9/1996 | Singh | 219/121.69 |
| 5,812,629 A * | 9/1998 | Clauser | 378/62 |
| 5,970,368 A * | 10/1999 | Sasaki et al. | 438/487 |
| 6,031,201 A | 2/2000 | Amako et al. | 219/121.68 |
| 6,220,058 B1 * | 4/2001 | Koyama et al. | 65/392 |
| 6,291,797 B1 * | 9/2001 | Koyama et al. | 219/121.73 |
| 6,376,799 B1 * | 4/2002 | Amako et al. | 219/121.77 |
| 6,456,416 B1 * | 9/2002 | Ichimura et al. | 359/241 |
| 6,552,301 B2 * | 4/2003 | Herman et al. | 219/121.71 |
| 6,573,026 B1 * | 6/2003 | Aitken et al. | 430/290 |
| 6,657,160 B2 * | 12/2003 | Hackel et al. | 219/121.85 |
| 6,741,621 B2 * | 5/2004 | Asano | 372/28 |
| 6,859,318 B1 * | 2/2005 | Mossberg | 359/569 |
| 7,091,125 B2 * | 8/2006 | Werner et al. | 438/669 |
| 7,247,527 B2 * | 7/2007 | Shimomura et al. | 438/149 |
| 7,421,158 B2 * | 9/2008 | Fainman et al. | 385/31 |
| 7,438,824 B2 * | 10/2008 | Taylor et al. | 216/62 |
| 7,655,376 B2 * | 2/2010 | Anderson et al. | 430/269 |
| 7,732,104 B2 * | 6/2010 | Wagner | 430/5 |
| 7,796,317 B2 * | 9/2010 | Iwase | 359/237 |
| 2002/0001779 A1 * | 1/2002 | Hidaka et al. | 430/313 |
| 2003/0169467 A1 * | 9/2003 | Miyagawa | 358/509 |
| 2004/0013805 A1 * | 1/2004 | Nagata et al. | 427/331 |
| 2004/0124184 A1 * | 7/2004 | An et al. | 219/121.66 |
| 2008/0216926 A1 * | 9/2008 | Guo et al. | 148/565 |

FOREIGN PATENT DOCUMENTS

| | | |
|---|---|---|
| JP | 59-168403 | 9/1984 |
| JP | 02-085350 | 3/1990 |
| JP | 4-91875 | 3/1992 |
| JP | 04-100900 | 4/1992 |
| JP | 04-253583 | 9/1992 |
| JP | 06-212451 | 8/1994 |
| JP | 410059746 A * | 3/1998 |
| WO | WO 02/16149 | 2/2002 |

OTHER PUBLICATIONS

"Relations Among Friction and Pull-Off Forces and Surface Geometry in Nano Meter-Scale" by Yasuhisa Ando et al. / Sep. 1999 The Japan Society of Mechanical Engineers International Journal (C Series) vol. 65, No. 637 / pp. 3784-3791.

"The effect of surface roughness on the adhesion of elastic solids" by K. N. G. Fuller et al. / 1975 Proceedings of the Royal Society of London, Series A, Mathematical and Physical Sciences, vol. 345, Issue 1642 / pp. 327-342.

"Lubricated friction of laser micro-patterned sapphire flats" by A. Blatter et al. / From Sep. 1998 Tribology Letters, publish by Springer Science+Business Media B.V., Formerly Kluwer Academic Publishers B.V., vol. 4, Nos. 3-4 / pp. 237-241.

"Periodic surface structures in the excimer laser ablative etching of polymers" by P. E. Dyer et al. / Aug. 20, 1990 Applied Physics Letters, vol. 57, Issue 8 / pp. 765-767.

"Laser-induced sub-half-micrometer periodic structure on polymer surfaces" by Hiroyuki Hiraoka et al. / Jan. 31, 1994 Applied Physics Letters, vol. 64, Issue 5 / pp. 563-565.

"Submicron periodic structures produced on polymer surfaces with polarized excimer laser ultraviolet radiation" by Matthias Bolle et al. / Feb. 10, 1992 Applied Physics Letters, vol. 60, Issue 6 / pp. 674-676.

"Stimulated Wood's Anomalies on Laser-Illuminated Surfaces" by Anthony E. Siegman et al. / Aug. 8, 1986 IEEE Journal of Quantum Electronics, vol. 22, No. 8 / pp. 1384-1403.

A.V. Demchuk et al., "Formation of periodic surface structures on silicon by millisecond-pulsed laser light" Soviet Physics Technical Physics, American Institute of Physics, New York, vol. 31, No. 4, Apr. 1, 1986, p. 494-495.

Matthias Bolle et al., "Submicron periodic structures produced on polymer surfaces with polarized excimer laser ultraviolet radiation" Applied Physics Letters, AIP, American Institute of Physics, Nelville, NY, vol. 60, No. 6, Feb. 10, 1992, pp. 674-676.

P. Milani et al., "Surface periodic structure induced by pulsed laser irradiation of fullerite" Applied Physics Letter, AIP, American Institute of Physics, vol. 68, No. 13, Mar. 25, 1996, p. 1769-1771.

* cited by examiner

Fig. 9(a)   Fig. 9(b)
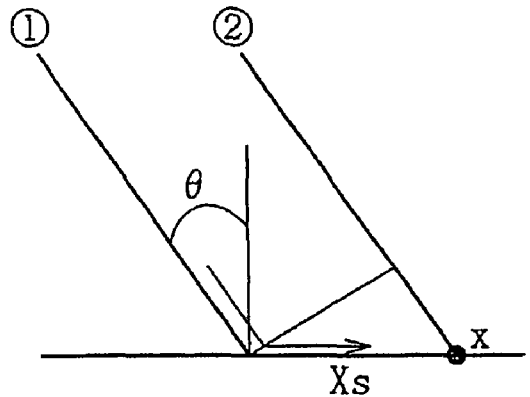 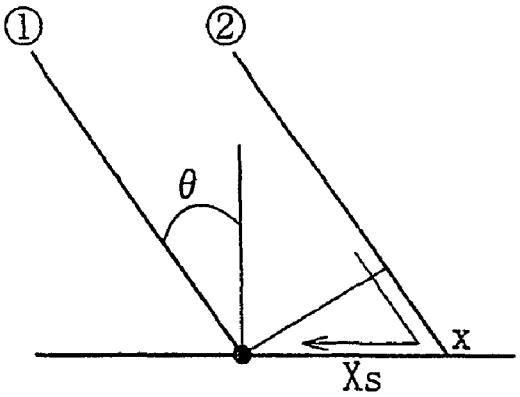
Fig. 10
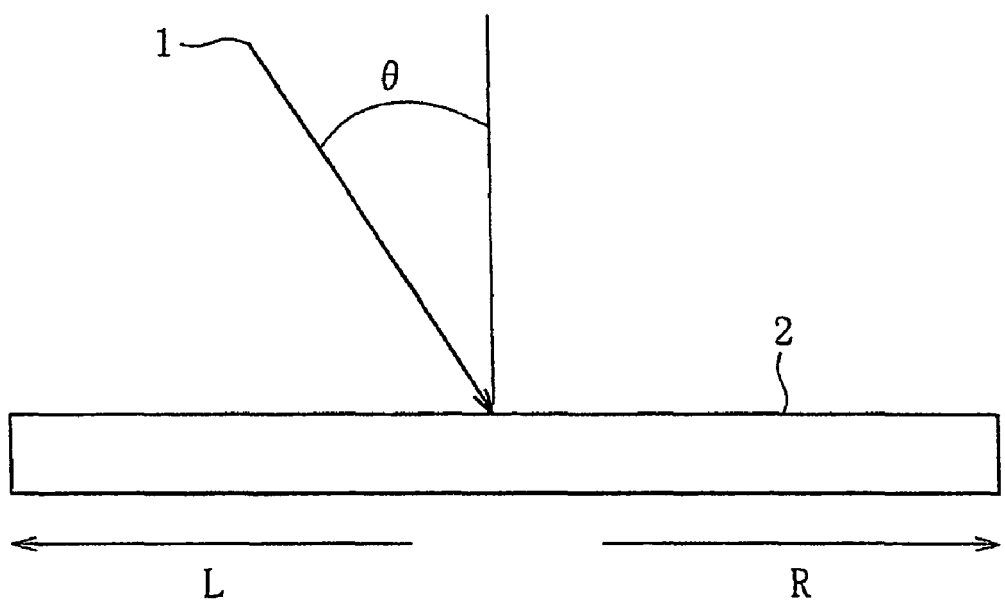

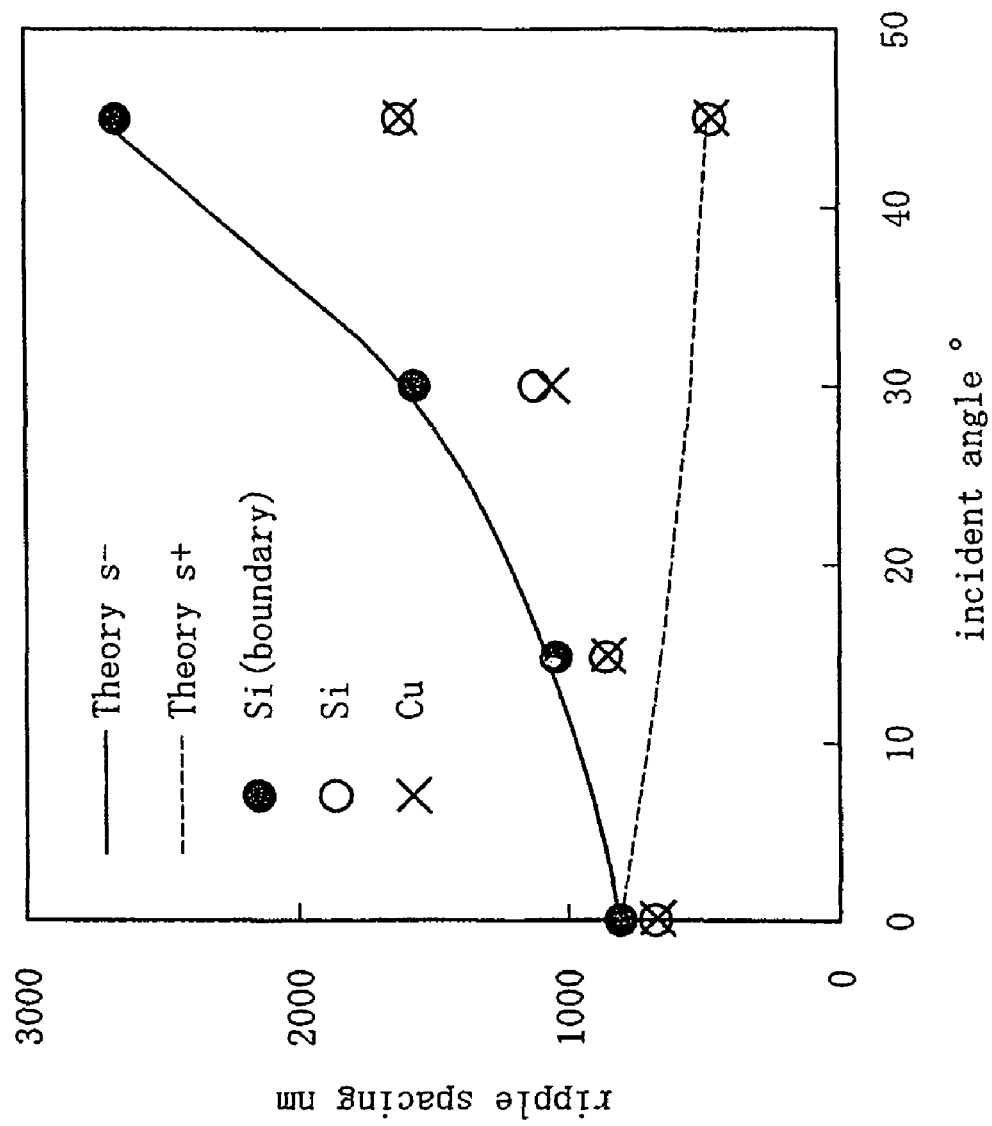

CYCLIC STRUCTURE FORMATION METHOD AND SURFACE TREATMENT METHOD

BACKGROUND OF THE INVENTION

1. Field of the Invention

The present invention relates to a method of forming a periodic structure and surface treatment, and more particularly to a method of periodically forming minute ripples on a surface of a material by irradiating a uniaxial laser beam thereon, and a surface treatment for changing surface characteristics of a material by irradiating a laser beam and thereby forming a periodic structure.

2. Description of the Related Art

Recently, development of micromachines, constituted of components that are a couple of orders of magnitude smaller than those of existing machines, has been aggressively promoted. While an inertia force such as the gravity is proportional to a cube of an object size, a surface force is proportional to a square of the object size. Therefore, when operating small parts such as those of a micromachine, an influence of the surface force acting between two objects becomes more apparent, rather than an influence of the gravity. Particularly, it is known that a pull-off force (or coagulating force), originating from a surface tension (or meniscus force) of water produced by condensation of moisture in the atmosphere at an interface between two objects, exerts a dominant influence to a friction force acting therebetween (Ref. non-patented document 1). It is also known that the pull-off force can be significantly reduced by minute ripples on the surface (Ref. non-patented document 2).

Also, it has been reported that minute ripples provide remarkable effect in retention of a lubricant and reduction of friction wear, which leads to an extended life span of the parts (Ref. non-patented document 3), and accordingly there has arisen a demand for development of a technique of forming a nanoscale microstructure on a material surface.

Likewise, it is known that irradiating a linearly polarized laser beam of a fluence near an ablation threshold to a polymer results in formation of a grate-shape minute periodic structure (Ref. non-patented documents 4, 5 and 6). It has also been reported that the same technique applies to a metal and a semiconductor as well, and that changing an irradiation angle can change a ripple spacing of the periodic structure (Ref. non-patented documents 7 and 8).

In all these cases a periodic structure of wavelength order is spontaneously formed, however it takes place only within a laser spot. Accordingly, those methods can only be applied to a limited region. In the event that a method of extensively forming such periodic structure on various materials is established, such method will serve to improve tribological characteristics of the material. Further, employing a femtosecond laser beam allows applying the method to small parts susceptible to a thermal effect, as well as to extremely thin parts.

In addition, for example the non-patented document 9 discloses a method of splitting a high-intensity femtosecond pulse of a titanium-sapphire laser into two parts, so that the interference of the biaxial laser beam forms a minute periodic structure, and a method of scanning a material attached to an X-Y stage in synchronization with a repetition frequency of a laser beam, to thereby form a periodic structure on an entirety of the material.

[Non-Patented Document 1]

Yasuhisa Ando, Toshiyuki Tanaka, Jiro Ino and Kazuo Kakuta: Relationships of Friction, Pull-off Forces and Nanometer-scale Surface Geometry, Series "C" of JSME (Japan Society of Mechanical Engineers) International Journal, No. 2, Vol. 44(2001), p. 453.

[Non-Patented Document 2]

K. N. G. Fuller and D. Taber,: The effect of surface roughness on the adhesion of elastic solids, Proc. Roy. Soc. Lond., A, 345, (1975) P. 327.

[Non-Patented Document 3]

M. Maillat, S. M. Pimenov, G. A. Shafeev and A. V. Simakin, Tribol Lett., 4, (1998), P. 237.

[Non-Patented Document 4]

P. E. Dyer and R. J. Farley: Periodic surface structures in the excimer laser ablative etching polymers., Appl. Phys. Lett., 57,8(1990) P. 765.

[Non-Patented Document 5]

H. Hiraoka and M. Sendova: Laser-induced sub-half-micrometer periodic structure on polymer surfaces, App. Phys. Lett., 64,5(1994) P. 563.

[Non-Patented Document 6]

M. Bolle and S. Lazare: Submicron periodic structures produced on polymer surfaces with polarized excimer laser ultraviolet radiation, Appl. Phys. Lett., 60,6(1992) P. 674.

[Non-Patented Document 7]

A. E. Siegman, P. M. Fauchet: Stimulated Wood's anomalies on laser-illuminated surfaces, IEEE J. Quantum Electron., QE-20,8(1986) P. 1384.

[Non-Patented Document 8]

Yukimasa Minami and Koichi Toyoda: Incident-angle dependency of laser-induced surface ripples on metals and semiconductors, Review of Laser Engineering, No. 12, Vol. 28 (2000), p. 824.

[Non-Patented Document 9]

Ken-ichi Kawamura, Masahiro Hirano and Hideo Hosono: Fabrication of micro-gratings on inorganic materials by two-beam holographic method using infrared femtosecond laser pulses, Review of Laser Engineering, No. 5, Vol. 30 (2002), p. 244.

However, the method of utilizing the interference of biaxial laser beams described in the non-patented document No. 9 has the following drawbacks. According to the method it is imperative to split the laser beam to form biaxial laser beams, with additional requirements such as setting an optical path difference to be strictly identical and strictly synchronizing a laser scanning speed with a ripple spacing of the periodic structure. Accordingly, control of optical axes is extremely complicated, and the apparatus inevitably becomes complicated and expensive. Besides, the method can only be applied to a flat surface because of utilizing the interference of two optical paths in different angles, and if a table supporting the material shakes, the ripple spacing of the periodic structure becomes uneven.

Likewise, the methods of forming a periodic structure described in the foregoing non-patented documents 1 through 9 are not appropriate for forming a periodic structure having an accurate ripple spacing over an extensive area through a simplified process, and therefore any practical application of those methods has not been established, since any effect thereof has not been proven yet.

Accordingly, it is an object of the present invention to provide a method of forming a periodic structure utilizing a uniaxial laser beam, instead of the foregoing biaxial laser beams, on a surface of various materials. It is another object of the present invention to provide a surface treatment technique of irradiating the laser beam on a surface of various materials, so as to change the surface characteristics thereof.

SUMMARY OF THE INVENTION

A first aspect of the present invention provides a method of forming a periodic structure, comprising irradiating a uniaxial laser beam near an ablation threshold to a surface of a material; and executing an overlapped scanning on the irradiated region, so as to cause an ablation at a section where interference has taken place between an incident beam and a surface scattered wave generated along the material surface, and to thereby cause spontaneous formation of a periodic structure.

Here, while various types of laser beam may be employed including a picosecond or nanosecond pulse laser of a $CO_2$ laser or YAG laser, it is preferable to employ a titanium-sapphire laser, for example. The titanium-sapphire laser may be employed in a form of an ultra-short pulse femtosecond laser having, for example, a pulse width of 120 fs, center wavelength of 800 nm, repetition frequency of 1 kHz, pulse energy of 0.25 to 400 µJ/pulse.

A second aspect of the present invention provides the method of forming a periodic structure, wherein the step of irradiating the laser beam includes setting the laser scanning speed such that 10 to 300 shots of laser beam irradiation is applied to an identical position, according to a laser spot diameter and a laser oscillating frequency.

A third aspect of the present invention provides the method of forming a periodic structure, wherein the step of irradiating the laser beam includes changing an incident angle of the laser beam to the material surface, to thereby change a ripple spacing of the periodic structure.

A fourth aspect of the present invention provides the method of forming a periodic structure, wherein the step of irradiating the laser beam includes irradiating the laser beam at an incident angle, and the step of executing an overlapped scanning includes changing a scanning direction of the laser beam so as to change the periodic structure.

A fifth aspect of the present invention provides the method of forming a periodic structure, wherein the step of irradiating the laser beam includes changing a direction of polarization so as to change a direction of the periodic structure.

A sixth aspect of the present invention provides the method of forming a periodic structure, further comprising utilizing a beam expander either with or without a cylindrical lens, thus expanding the laser beam to irradiate a more extensive area.

A seventh aspect of the present invention provides a method of surface treatment, comprising forming a grating structure on a surface of a material, to thereby change surface characteristics of the material.

An eighth aspect of the present invention provides the method of surface treatment, wherein the step of forming the grating structure includes irradiating a laser beam near an ablation threshold to the surface of the material; and executing an overlapped scanning on the irradiated region, to thereby cause spontaneous formation of the grating structure.

A ninth aspect of the present invention provides the method of surface treatment, wherein the step of forming the grating structure includes forming the grating structure so as to overlap in different directions.

A tenth aspect of the present invention provides the method of surface treatment, wherein the step of forming the grating structure includes disposing the grating structure in a mixed layout in different directions.

An eleventh aspect of the present invention provides the method of surface treatment, wherein the step of forming the grating structure includes irradiating a laser beam near an ablation threshold having a plurality of pulses of a different direction of polarization to the surface of the material, such that the pulses do not overlap in time; executing an overlapped scanning on the irradiated region, to thereby cause spontaneous formation of the grating structure so as to overlap in different directions.

A twelfth aspect of the present invention provides the method of surface treatment, wherein the step of forming the grating structure includes irradiating a laser beam near an ablation threshold to the surface of the material; and the step of executing an overlapped scanning includes changing the direction of polarization during the scanning, to thereby cause spontaneous formation of the grating structure in a mixed layout in different directions.

A thirteenth aspect of the present invention provides the method of surface treatment, further comprising utilizing a cylindrical lens to condense the laser beam, thus forming the grating structure in a more extensive area.

A fourteenth aspect of the present invention provides the method of surface treatment, wherein the grating structure is formed with a ripple spacing of 1 µm or less.

A fifteenth aspect of the present invention provides the method of surface treatment, wherein the surface characteristics include dustproofness and inhibition of particle adhesion.

A sixteenth aspect of the present invention provides the method of surface treatment, wherein the surface characteristics include reduction of friction and friction wear.

A seventeenth aspect of the present invention provides the method of surface treatment, wherein the surface characteristics include reduction of wettability.

In the case of irradiating an ultra-short pulse laser (femtosecond laser) beam to a material surface as the first aspect of the present invention, the material is protected from thermal degradation of its properties owing to the extremely small pulse width of the laser, because heat conduction barely takes place and hence a substrate temperature close to the irradiation point barely increases, unlike the case of irradiating a picosecond or nanosecond pulse laser of a $CO_2$ laser or YAG laser. In addition, since a minute periodic structure can be formed only at a point where the laser beam has been irradiated, this method is quite suitable for processing small parts such as those for a micromachine.

More specifically, a thermal diffusion length $L_D$ of the laser beam irradiation can be defined as $L_D=(D\tau_1)^{1/2}$, where D represents a thermal diffusion coefficient of the material, and $\tau_1$ a pulse width of the laser. Here, the thermal diffusion coefficient is defined as $D=k_T/\rho c_p$, where $k_T$, $\tau$, and $c_p$ are thermal conductivity, density, and specific heat, respectively. Accordingly, since the thermal diffusion length $L_D$ is proportional to the square root of the pulse width $\tau_1$, irradiating an ultra-short pulse laser beam makes the thermal diffusion length very short, and when the pulse width is shorter than a picosecond level, the thermal diffusion is reduced to a practically negligible level, which is advantageous for processing small parts.

When the laser beam is irradiated on the substrate surface, the laser beam is scattered by bumps and dips on the substrate, which is defined as a surface scattering. When a linear-polarized laser beam is irradiated on the substrate, an interference takes place between the p-polarization component of the incident beam 1 and the surface scattered wave along the substrate surface. When the fluence of the incident beam is near the ablation threshold, the ablation takes place only at a region of the interference between the incident beam and the surface scattered wave along the substrate surface. Once the ablation starts and thereby a surface roughness increases, an intensity of the surface scattering becomes greater at the next irradiation of the laser beam, by which the ablation progresses and the interference also occurs at a region one wavelength λ farther. By repeating the laser beam irradiation, a periodic structure (grating structure) is spontaneously formed, at an interval equal to one wavelength. In this way, irradiation of a uniaxial laser beam can form a periodic structure. Accordingly, the apparatus can be simplified, and hence can be manufactured at a lower cost. Besides, this method provides the advantages that the ripple spacing of the periodic structure is not affected by a vibration of the table, and that the processing can be performed over a broader range of working distance in the direction of the optical axis, such that the periodic structure can also be formed on a curved surface.

The ripples of the periodic structure spontaneously and sequentially formed at a wavelength interval by repetition of the laser beam irradiation, as the second aspect of the present invention, grow to the order of the wavelength by scores of shots, but irradiation of more than 300 shots incurs an excessive thermal effect, thus to make the structure vague. Accordingly, performing the overlapped scanning with 10 to 300 shots of laser beam irradiation to an identical position, allows forming the periodic structure over an extended area.

According to the third aspect of the present invention, changing an incident angle of the laser beam causes a change of the ablation resultant from the interference between the incident beam and the surface scattered wave along the material surface, thus enabling a change in ripple spacing. Therefore, a periodic structure of a desired ripple spacing can be formed.

According to the fourth aspect of the present invention, changing a scanning direction of the laser beam that has an incident angle causes a change of the ablation resultant from the interference between the incident beam and the surface scattered wave along the material surface, thus enabling a change in periodic structure. Therefore, a different periodic structure can be formed simply by changing the scanning direction, under the same laser beam irradiating conditions. Changing both the laser scanning direction and the laser beam incident angle allows making a more extensive variety of changes in the periodic structure.

The fifth aspect of the present invention is based on the fact that the periodic structure is formed orthogonally to a direction of polarization. Accordingly, changing the direction of polarization of the periodic structure enables changing a direction of the periodic structure.

According to the sixth aspect of the present invention, expanding the laser beam by a beam expander, or flattening the expanded laser beam by a cylindrical lens allows executing the laser beam irradiation over a broader area at a time, thus enabling efficient formation of the periodic structure over an extensive area.

With the surface treatment method according to the seventh aspect of the present invention, surface characteristics of the material can be changed by forming a grating structure on the material surface.

As a specific method a laser beam is irradiated on the material surface so as to form the grating structure, in which case, while various types of laser beam may be employed including a picosecond or nanosecond pulse laser of a $CO_2$ laser or YAG laser, it is preferable to employ a titanium-sapphire laser, for example. The titanium-sapphire laser may be employed in a form of an ultra-short pulse femtosecond laser having, for example, a pulse width of 120 fs, center wavelength of 800 nm, repetition frequency of 1 kHz, pulse energy of 0.25 to 400 μJ/pulse.

In the case of irradiating an ultra-short pulse laser (femtosecond laser) beam to a material surface, the material is protected from thermal degradation of its properties owing to the extremely small pulse width of the laser, because heat conduction barely takes place and hence a substrate temperature close to the irradiation point barely increases, unlike the case of irradiating a picosecond or nanosecond pulse laser of a $CO_2$ laser or YAG laser. In addition, since a minute grating structure can be formed only at a point where the laser beam has been irradiated, this method is quite suitable for processing small parts such as those for a micromachine.

More specifically, a thermal diffusion length $L_D$ of the laser beam irradiation can be defined as $L_D=(D\tau_1)^{1/2}$, where D represents a thermal diffusion coefficient of the material, and $\tau_1$ a pulse width of the laser. Here, the thermal diffusion coefficient is defined as $D=k_T/\rho c_p$, where $k_T$, $\rho$, $c_p$ are thermal conductivity, density and specific heat respectively. Accordingly, since the thermal diffusion length $L_D$ is proportional to the square root of the pulse width $\tau_1$, irradiating an ultra-short pulse laser beam makes the thermal diffusion length very short, and when the pulse width is shorter than a picosecond level, the thermal diffusion is reduced to a practically negligible level, which is advantageous for processing small parts.

When the laser beam is irradiated on the substrate surface, the laser beam is scattered by bumps and dips on the substrate, which is defined as a surface scattering. When a linear-polarized laser beam is irradiated on the substrate, an interference takes place between the p-polarization component of the incident beam 1 and the surface scattered wave along the substrate surface. When the fluence of the incident beam is near the ablation threshold, the ablation takes place only at a region of the interference between the incident beam and the surface scattered wave along the substrate surface. Once the ablation starts and thereby a surface roughness increases, an intensity of the surface scattering becomes greater at the next irradiation of the laser beam, by which the ablation progresses and the interference also occurs at a region one wavelength λ farther. By repeating the laser beam irradiation, the grating structure is spontaneously formed, at an interval equal to one wavelength. In this way, irradiation of a uniaxial laser beam can form the grating structure. Forming such grating structure on the material surface allows changing one or a plurality of the surface characteristics including inhibition of dust or particle adhesion, resistance against friction and friction wear, wettability and so forth.

According to the eighth aspect of the present invention, irradiating a laser beam near an ablation threshold to the surface of the material and executing an overlapped scanning on the irradiated region causes spontaneous formation of the grating structure. The grating structure can be formed for example in an X direction or Y direction, according to a direction of polarization of the laser beam. The ripples formed by the laser beam irradiation grow to the order of the wavelength by scores of shots, but irradiation of more than 300 shots incurs an excessive thermal effect, thus to make the structure vague. Accordingly, performing the overlapped scanning with 10 to 300 shots of laser beam irradiation to an identical position allows forming the grating structure over an extended area.

The ninth aspect of the present invention is based on the fact that changing a direction of polarization of the laser beam allows changing a direction of the grating structure. In the case where, after once forming a grating structure by irradiating a laser beam near an ablation threshold and executing an overlapped scanning on the irradiated region in one direction, a relative angle between the material surface and the direction of polarization of the laser beam is changed, followed by irradiation of the laser beam near the ablation threshold and overlapped scanning on the irradiated region over the grating structure already formed, a composite grating structure overlapped in a different direction can be formed. Accordingly, changing the relative angle between the material surface and the direction of polarization of the laser beam by 90 degrees, when forming the latter grating structure, results in formation of a check patterned grating structure, and changing the relative angle between the material surface and the direction of polarization of the laser beam by a desired angle other than 90 degrees leads to formation of a bias check patterned grating structure.

The tenth aspect of the present invention is also based on the fact that changing a direction of polarization of the laser beam allows changing a direction of the grating structure. In the case where, after once forming a continuous or spaced grating structure in one direction by irradiating a laser beam near an ablation threshold and executing an overlapped scanning on the irradiated region in one direction, a relative angle between the material surface and the direction of polarization of the laser beam is changed, followed by irradiation of the laser beam near the ablation threshold on a region adjacent to or spaced from the grating structure already formed and overlapped scanning on the newly irradiated region, a different grating structure can be formed in the region adjacent to or spaced from the first formed grating structure. Accordingly, changing the relative angle between the material surface and the direction of polarization of the laser beam by 90 degrees, when forming the latter grating structure, results in formation of a grating structure in an X direction and the other in a Y direction, disposed in a mixed layout, and changing the relative angle between the material surface and the direction of polarization of the laser beam by a desired angle other than 90 degrees leads to formation of the grating structures oriented in different directions and disposed in a mixed layout.

According to the eleventh aspect of the present invention, a laser beam emitted by a laser generator is split into two laser beams with a half mirror, thus to produce an optical delay in one of the beams. The both beams are subjected to a polarizer for polarization in a predetermined direction, and transmitted to another half mirror, which merges the two beams polarized in the predetermined direction, so that both beams are irradiated on a material surface. In this way, a laser beam near an ablation threshold having a plurality of pulses and including beams of a different direction of polarization can be irradiated on the material surface, at a predetermined time interval. Then, the overlapped scanning on the irradiated region results in spontaneous and simultaneous formation of a grating structure overlapped in different directions. Accordingly, for example, irradiating a laser beam near an ablation threshold having a plurality of pulses and directions of polarization that are different by 90 degrees at a predetermined time interval, and executing an overlapped scanning over the irradiated region, results in spontaneous and simultaneous formation of a check patterned grating structure overlapped in an X direction and in Y direction which is orthogonal to the X direction. Also, irradiating laser beams near an ablation threshold having a plurality of pulses and directions of polarization that are different by a desired angle other than 90 degrees at a predetermined time interval, and executing an overlapped scanning over the irradiated region, results in spontaneous and simultaneous formation of a bias check patterned grating structure intersecting in the desired angle other than 90 degrees.

The twelfth aspect of the present invention is also based on the fact that changing a direction of polarization of the laser beam allows changing a direction of the grating structure. In the case where, after once forming a grating structure in a predetermined length by irradiating a laser beam near an ablation threshold and executing an overlapped scanning on the irradiated region, the direction of polarization of the laser beam is changed while continuing the irradiation, followed by irradiation of the laser beam near the ablation threshold on a region adjacent to or spaced from the grating structure already formed, and overlapped scanning on the newly irradiated region, a different grating structure can be formed in the region adjacent to or spaced from the first formed grating structure. Accordingly, changing the direction of polarization of the laser beam by 90 degrees when forming the latter grating structure results in formation of a grating structure in an X direction and the other in a Y direction disposed in a mixed layout, and changing the direction of polarization of the laser beam by a desired angle other than 90 degrees and desired times results in formation of the desired number of grating structures, oriented in the desired directions and disposed in a mixed layout.

According to the thirteenth aspect of the present invention, the laser beam is expanded to a larger diameter laser beam by a beam expander, and the larger diameter laser beam is then condensed by a cylindrical lens, to be thereby transformed to a narrow and long linear laser beam. Irradiating such linear laser beam on a material surface and executing an overlapped scanning on the irradiated region results in spontaneous formation of the grating structure over an extensive area. Accordingly, a large area grating structure can be formed in a short time.

According to the fourteenth aspect of the present invention, a minute grating structure with a ripple spacing of 1 μm or less can be easily provided, which is unobtainable through an existing mechanical processing. Such surface treatment method can be applied not only to a surface of small parts for a micromachine, but also to a surface of ordinary parts, to thereby change the surface characteristics thereof.

Referring to the fifteenth aspect of the present invention, the grating structure reduces a pull-off force originating from a surface tension of water produced by condensation of moisture in the atmosphere, and thereby reduces a sticking force of dust or fine particles to the outermost surface of the material. Therefore, the surface characteristics can be improved in the aspect of inhibiting dust or fine particle adhesion.

Referring to the sixteenth aspect of the present invention, the reduction of the pull-off force by the grating structure effectively serves, in the case of dry friction without a lubricant, to reduce a force acting on a surface of a mating material in sliding contact with the outermost surface of the grating structure. This leads to improvement of the surface characteristics in the aspect of reduction of friction and friction wear. In the case where a lubricant is employed, the reduction effect of friction and friction wear can be equally achieved, because the grating structure has the functions of retaining and supplementing the lubricant, granting capability of forming a fluid film, and preventing adhesion of worn powder.

Referring to the seventeenth aspect of the present invention, the grating structure increases a ratio of an actual surface area of the material against an apparent surface area, and thereby reduces a surface energy than an amount apparently supposed to be. Accordingly, the material surface attains reduced wettability.

BRIEF DESCRIPTION OF THE DRAWINGS

FIGS. 9(a) and 9(b) are drawings for explaining generation of an S− type interference and an S+ type interference, respectively, between an incident beam and scattered wave.

FIG. 10 is a drawing for explaining a definition of specimen feeding direction when the incident beam is inclined;

FIG. 13 is a line graph showing an incident angle dependency of ripple spacing of a periodic structure formed on silicon and copper;

DETAILED DESCRIPTION OF THE INVENTION

Figure 1:
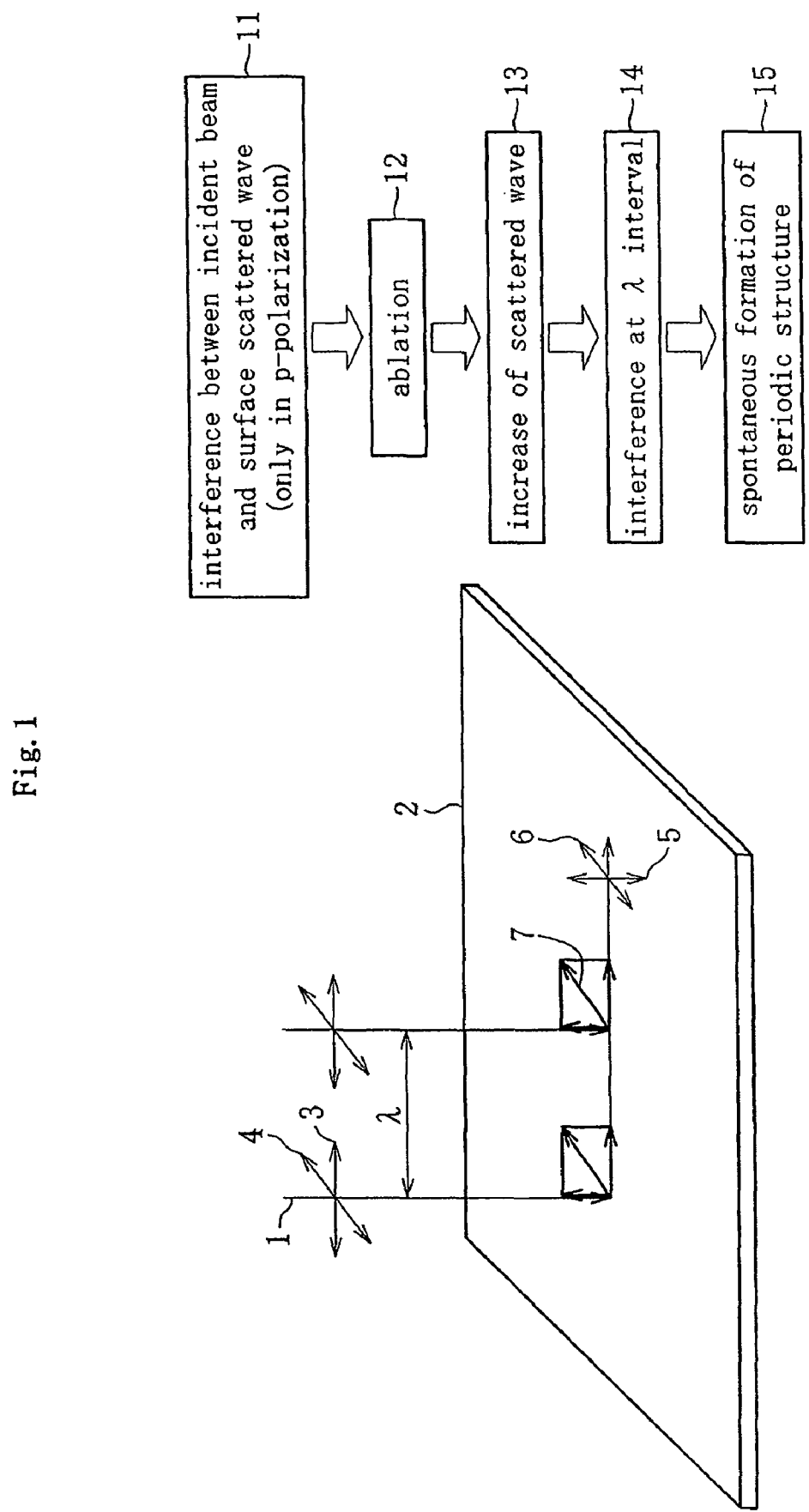
FIG. 1 includes a schematic perspective drawing and a flowchart for explaining a method of forming a periodic structure according to an embodiment of the present invention.

With reference to the accompanying drawings, principles for embodying the present invention will be described hereunder. FIG. 1 includes a schematic perspective drawing for explaining an underlying mechanism for the method of forming a periodic structure and of surface treatment according to the present invention, and a flowchart showing a formation process of the periodic structure. Referring to the perspective drawing in FIG. 1, when a laser beam 1 is irradiated on a surface of a specimen 2, an interference between a p-polarization component 3 of the incident beam and a p-polarization component 5 of a surface scattered wave takes place, to thereby generate a stationary wave 7. Here, numeral 4 designates an S-polarization component of the incident beam, and 6 an S-polarization component of the surface scattered wave.

When the fluence of the incident beam is near the ablation threshold of the laser, the ablation takes place only at a region of the interference between the p-polarization component 3 of the incident beam and the p-polarization component 5 of the surface scattered wave along the substrate surface (12 of the flowchart). Once the ablation starts and thereby a surface roughness increases, an intensity of the surface scattering becomes greater at the next irradiation of the laser beam (13), by which the ablation progresses and the interference also occurs at a region one wavelength λ farther. When the incident beam is linearly polarized, repetition of the laser beam irradiation causes an interference at an interval equal to the wavelength λ of the incident beam (14), and thus a periodic structure is spontaneously formed (15).

The ripples of the periodic structure grow to the order of the wavelength by 10 to 300 shots of irradiation, but irradiation of more than 300 shots makes the ripple structure vague. Accordingly, performing the overlapped scanning with 10 to 300 shots of laser beam irradiation to an identical position allows forming the grating structure over an extended area. For the scanning, either of the table supporting the specimen 2 or the laser emitter may be moved.

Figure 2:
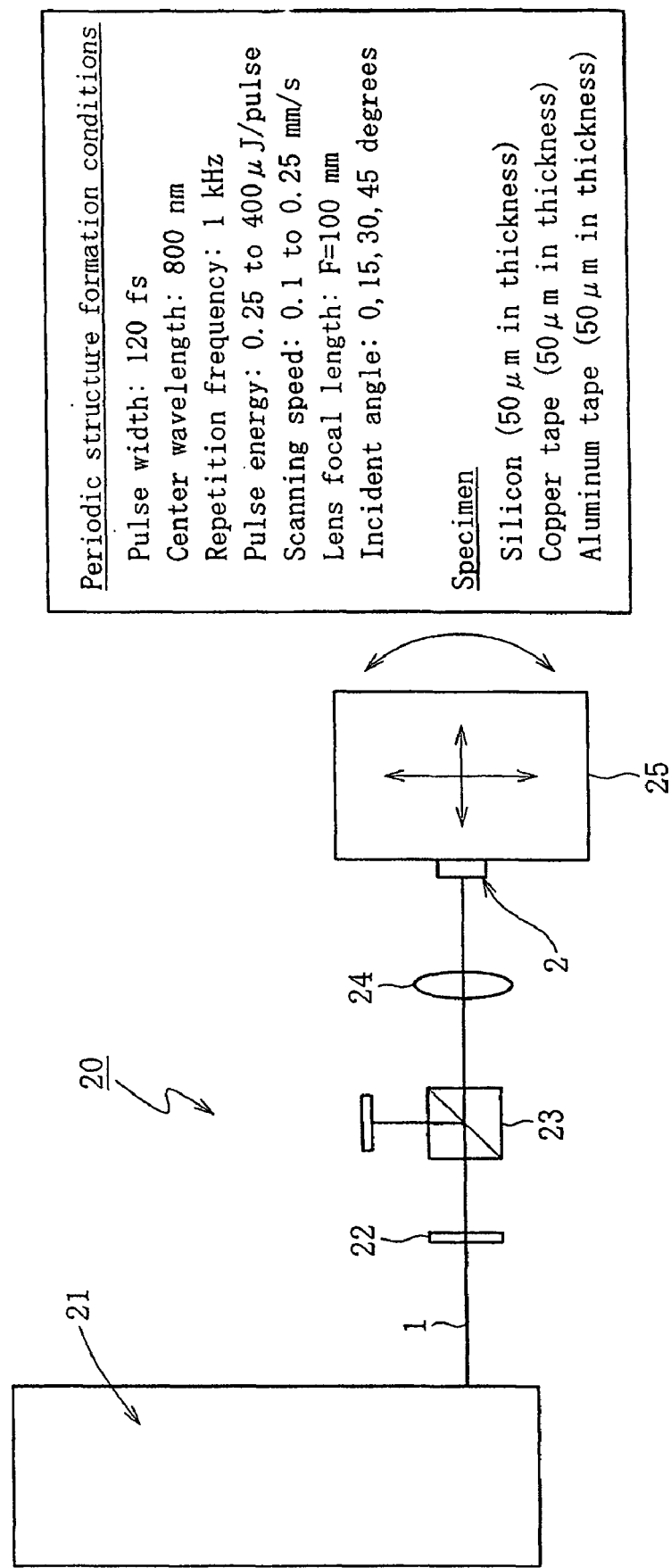
FIG. 2 is a schematic diagram showing a configuration of an apparatus to be used for forming a periodic structure according to the embodiment.

FIG. 2 is a schematic diagram showing a configuration of an apparatus to be used for forming the periodic structure 20. It is to be noted in advance that specific numerical values indicated in the following passages are only exemplarily stated for clearer understanding of the description, and not for delimiting purpose. A titanium-sapphire laser beam 1 (pulse width: 120 fs, center wavelength λ: 800 nm, repetition frequency: 1 kHz, pulse energy E: 0.25 to 400 µJ/pulse) generated by a titanium-sapphire laser generator 21, upon being set such that the pulse energy is adjustable with a ½ wavelength plate 22 and a polarizing beam splitter 23, was irradiated on a surface of the specimen 2 on an X-Y-θ stage 25, through a lens (focal length: f=100 mm) 24. The resolution of the X-Y-θ stage 25 may be set as desired, and was actually set at 2 μm as an example. The X-Y-θ stage 25 was set to move the specimen 2 at a speed of 0.25 mm/s (125 pps) so as to perform overlapped irradiation of the laser beam 1 on the specimen 2, and to cause the ablation by the interference between the incident beam and the surface scattered wave along the surface, for successive formation of a periodic structure.

A scanning speed for the specimen 2 is set according to a spot diameter and intensity of the laser beam 1. The incident angle θ to the specimen 2 was set at 0 degree, 15 degrees, 30 degrees and 45 degrees. As the specimen 2, a silicon, a copper tape and an aluminum tape of 50 μm in thickness, as well as an aluminum foil of 15 μm in thickness were employed. For observation of the periodic structure thus obtained, a laser microscope and an atomic force microscope (AFM) were utilized.

[Periodic Structure on Silicon (Incident Angle 0 Degree)]

Figure 3A:
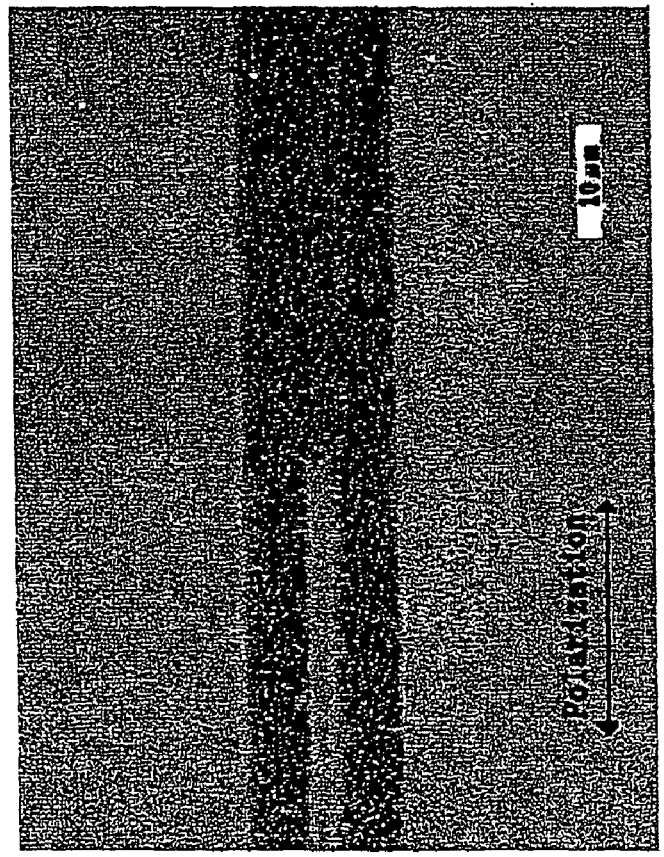
FIG. 3(a) is a plan view showing a periodic structure formed on a silicon surface by three-times laser scanning parallel to a direction of polarization, by the method of forming a periodic structure according to the embodiment.
Figure 3B:
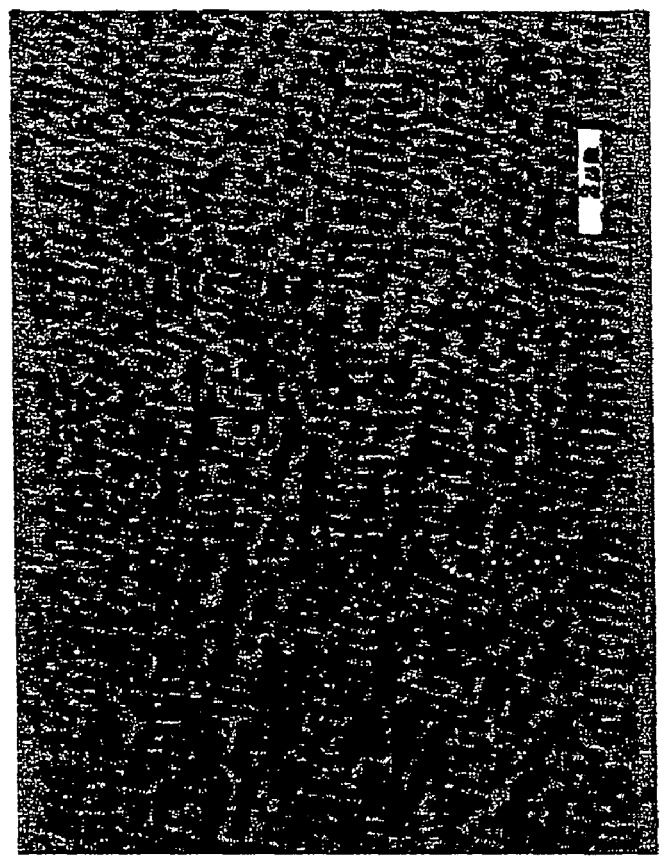
FIG. 3(b) is an enlarged view showing a part of the periodic structure of FIG. 3(a)
Figure 4B:
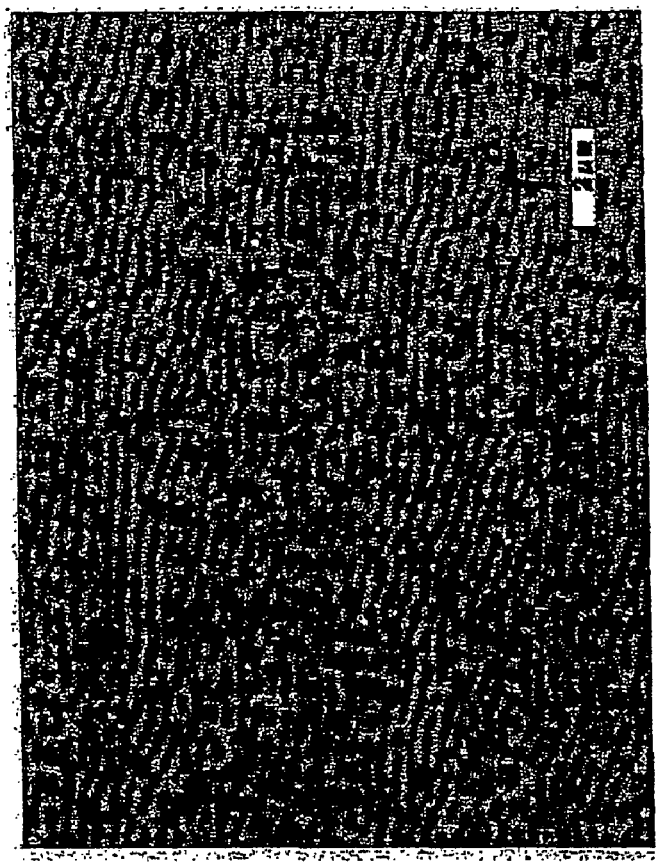
FIG. 4(b) is an enlarged view showing a part of the periodic structure of FIG. 4(a)
Figure 4A:
FIG. 4(a) is a plan view showing a periodic structure formed on a silicon surface by three-times laser scanning orthogonal to a direction of polarization, by the method of forming a periodic structure according to the embodiment.

A surface of the silicon substrate, employed as the specimen 2, was scanned three times by the laser beam 1 near the ablation threshold, through a piano-convex lens 24 of a focal length of 100 mm, to thereby form a periodic structure. FIGS. 3(a) and 3(b) show the periodic structure formed with the scanning direction of the laser beam 1 and the direction of polarization set in parallel. FIGS. 4(a) and 4(b) show the periodic structure formed with the direction of polarization rotated by 90 degrees. FIGS. 3(a) and 4(a) show an overall appearance, while FIGS. 3(b) and 4(b) show enlarged images of the periodic structure. Referring to FIGS. 3(a) and 4(a), the laser beam irradiation was suspended halfway of the second scan, for visual understanding that the scanning was performed three times. These periodic structures are all oriented orthogonally to the direction of polarization. The ripple spacing of the periodic structure is approx. 700 nm, which is slightly shorter than the laser wavelength λ (800 nm). Overlapped sections of the scanning do not present a significant disorder.

Figure 5:
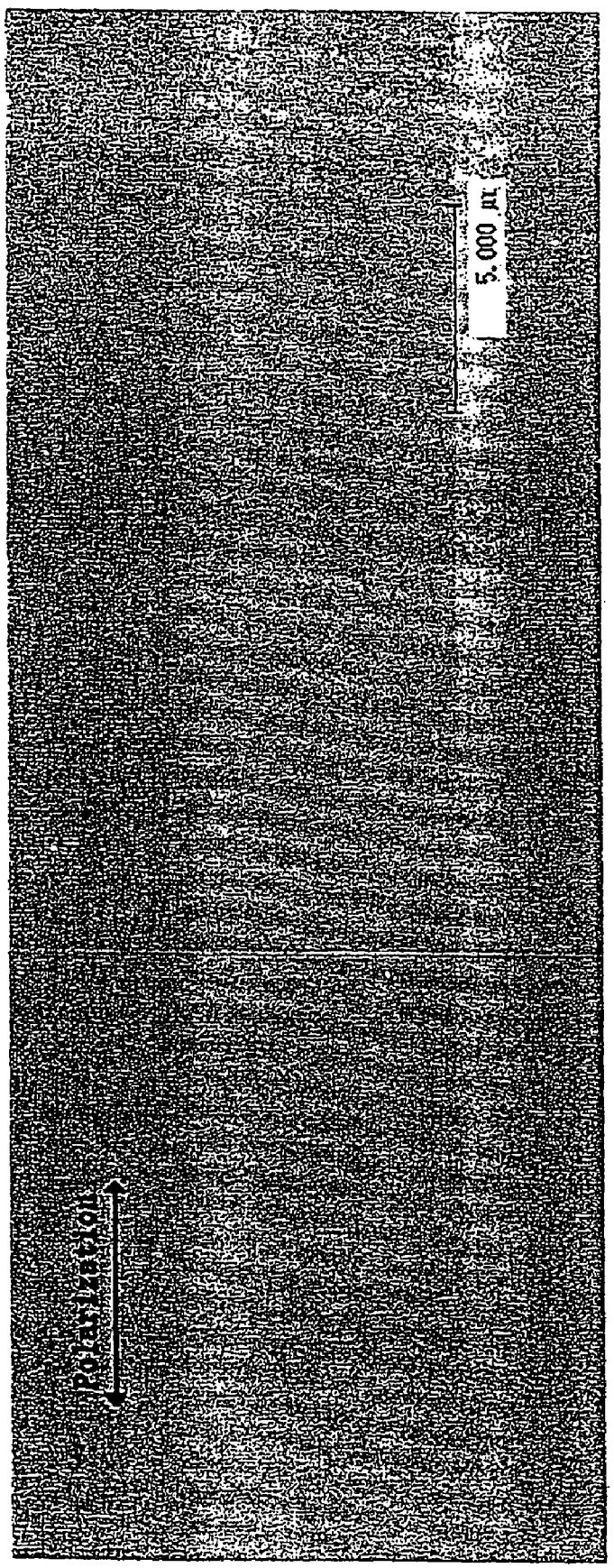
FIG. 5 is a plan view showing a periodic structure formed on a silicon surface with a laser fluence closest possible to the ablation threshold, by the method of forming a periodic structure according to the embodimen.

FIG. 5 shows a periodic structure formed with a laser fluence lowered closest possible to the ablation threshold, so as to restrain the ablation as much as possible. The ripple spacing is 795 nm, which is well in accordance with the laser wavelength λ (center wavelength 800 nm).

Figure 6:
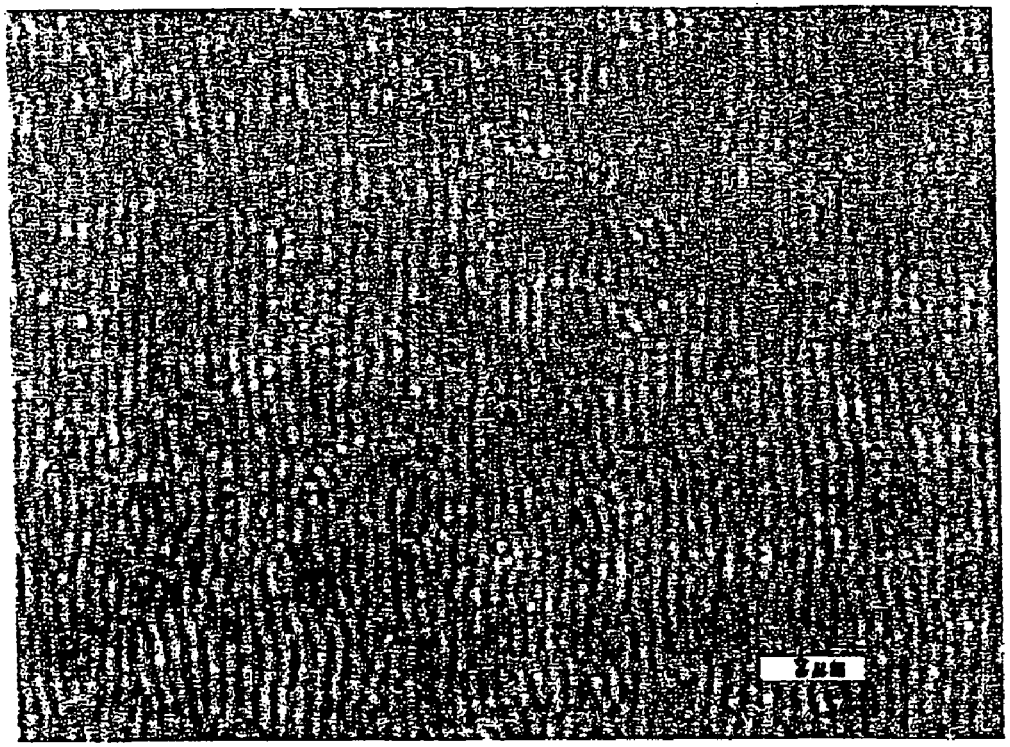
FIG. 6 is an enlarged plan view showing a periodic structure formed with a cylindrical lens placed on the silicon surface, by the method of forming a periodic structure according to the embodiment.

In order to form the periodic structure over a more extensive area, a beam expander was employed to expand the laser beam, and also a cylindrical lens having a focal length of 100 mm was employed. As a result, the periodic structure has been formed in a width exceeding 2 mm by one scan. Such periodic structure is shown in FIG. 6. The ripple spacing is 700 nm, which is similar to that of the periodic structure formed by the laser beam near the ablation threshold through the piano-convex lens as FIG. 3(b).

Upon irradiating a white light on the periodic structure formed through the cylindrical lens, a spectroscopic capability has been confirmed, by which it has been proven that the periodic structure is formed at regular intervals over an extensive area.

[Periodic Structure on Copper Tape (Incident Angle 0 Degree)]

Figure 7:
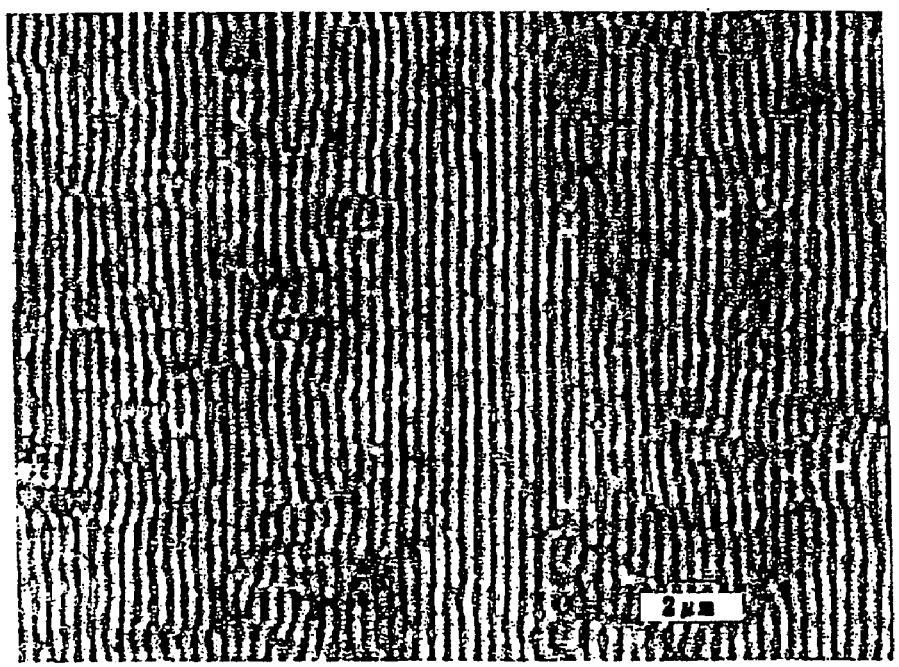
FIG. 7 is a plan view showing a periodic structure formed with a cylindrical lens placed on a surface of a copper tape, by the method of forming a periodic structure according to the embodiment.

Upon forming a periodic structure on the copper tape through the cylindrical lens having the focal length of 100 mm, a similar periodic structure to that formed on the silicon has been obtained, over a width exceeding 2 mm by one scan. However in the case of the copper tape, setting the work distance at 99 mm, which is 1 mm shorter than the focal length, resulted in forming a relatively excellent periodic structure. Also, more than three times of pulse energy (E=400 μJ/pulse) was required with respect to the case of the silicon (E=100 μJ/pulse). FIG. 7 shows the periodic structure formed on the copper tape. The ripple spacing of the periodic structure is approx. 700 nm, which is substantially the same as that of the silicon. Upon irradiating a white light on the periodic structure formed through the cylindrical lens, a spectroscopic capability has been confirmed as with the silicon.

[Periodic Structure on Aluminum Tape and Foil (Incident Angle 0 degree)]

Figure 8B:
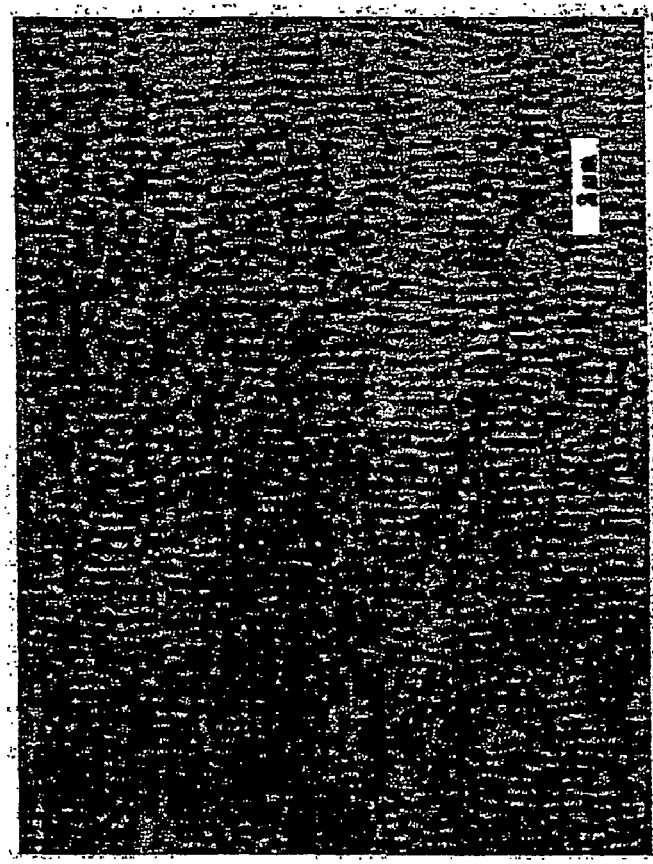
FIGS. 8(a) and 8(b) are enlarged plan views showing a periodic structure formed on a surface of an aluminum tape and an aluminum foil, respectively, by the method of forming a periodic structure according to the embodiment.
Figure 8A:
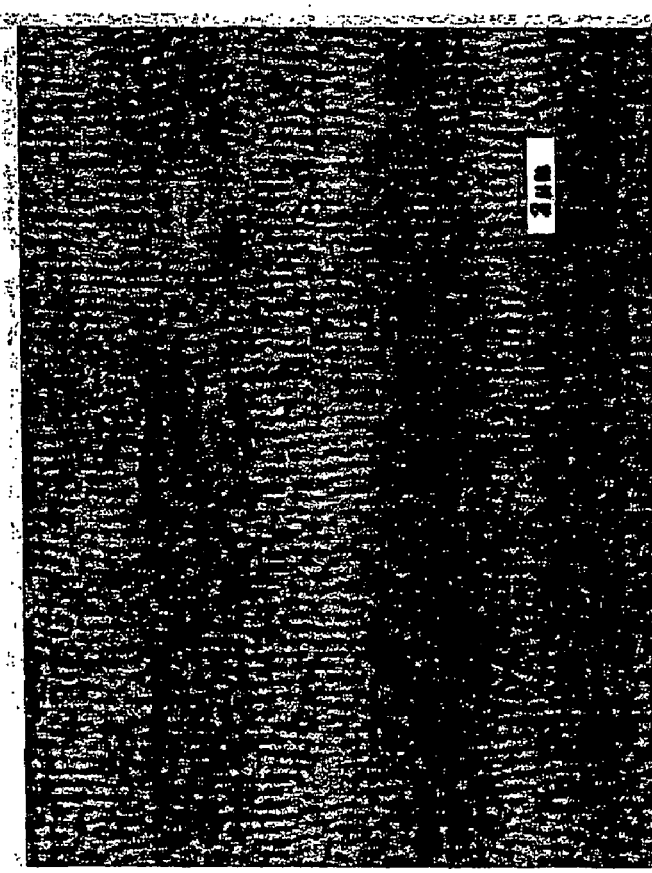

Upon forming a periodic structure on the aluminum tape and the aluminum foil through the beam expander and the cylindrical lens having the focal length of 100 mm, periodic structures respectively shown in FIGS. 8(a) and 8(b) have been obtained. The ripple spacing of the periodic structure on the aluminum tape and the aluminum foil is 600 nm. Upon irradiating a white light on both of the periodic structures, a spectroscopic capability has been confirmed. Also, thermal effect has not been observed on a rear face of the aluminum foil of 15 μm in thickness.

[Incident Angle Dependence and Scanning Direction Dependence of the Periodic Structure]

When a laser beam 1 of a wavelength λ is irradiated on the specimen 2 at an incident angle θ, two types of interference take place as shown in FIGS. 9(a) and 9(b). Hereinafter, in order to distinguish these interferences, the interference with a wider interval as shown in FIG. 9(a) is defined as an "S− type" interference, and the interference with a narrower interval as shown in FIG. 9(b) as an "S+type" interference. When the respective intervals are designated by $X_{S-}$ and $X_{S+}$, the interval $X_{S-}$ in the case of FIG. 9(a) is obtained by the following formula:

$$X_{s-} = \frac{\lambda}{1 - \sin\theta} \qquad \text{[Formula 1]}$$

The interval $X_{S+}$ in the case of FIG. 9(b) is obtained by the following formula:

$$X_{s+} = \frac{\lambda}{1 + \sin\theta} \qquad \text{[Formula 2]}$$

Upon irradiating the laser beam 1 on the specimen 2 through the beam expander and the cylindrical lens at the incident angle θ of 15 degrees, 30 degrees and 45 degrees, a periodic structure having different intervals has been formed in an overlapped state, on the silicon and the copper tape. Especially when moved in a feed direction L shown in FIG. 10, both of the S− type with a wider interval and the S+ type with a narrower interval have been formed with a clear contrast. On the other hand, when moved in a feed direction R, formation of the S− type has been immature in comparison with the case of the feed direction L.

Figure 11B:
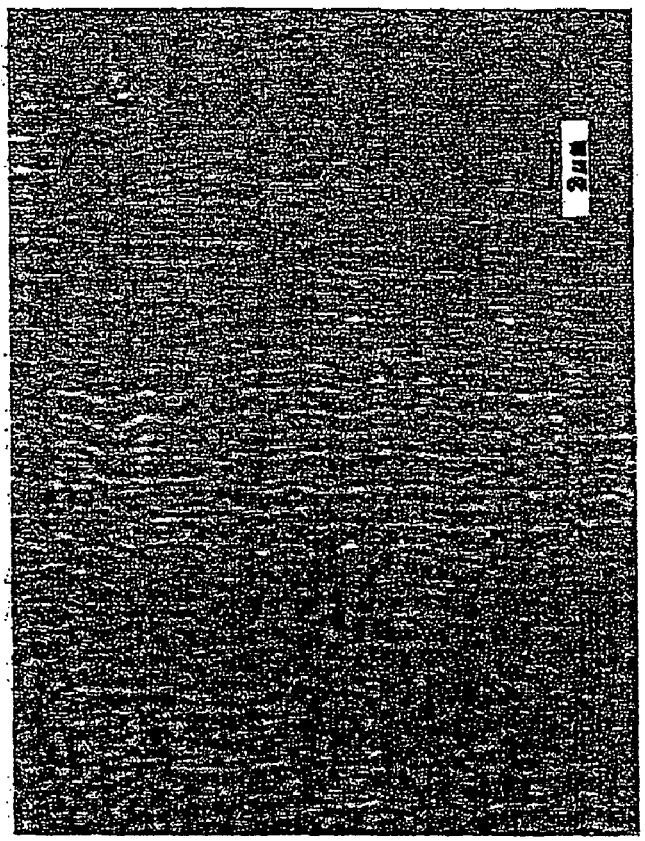
FIGS. 11(a) and 11(b) are enlarged plan views showing a periodic structure of the S− type and S+ type, respectively, formed by feeding the copper tape in the direction L.
Figure 11A:
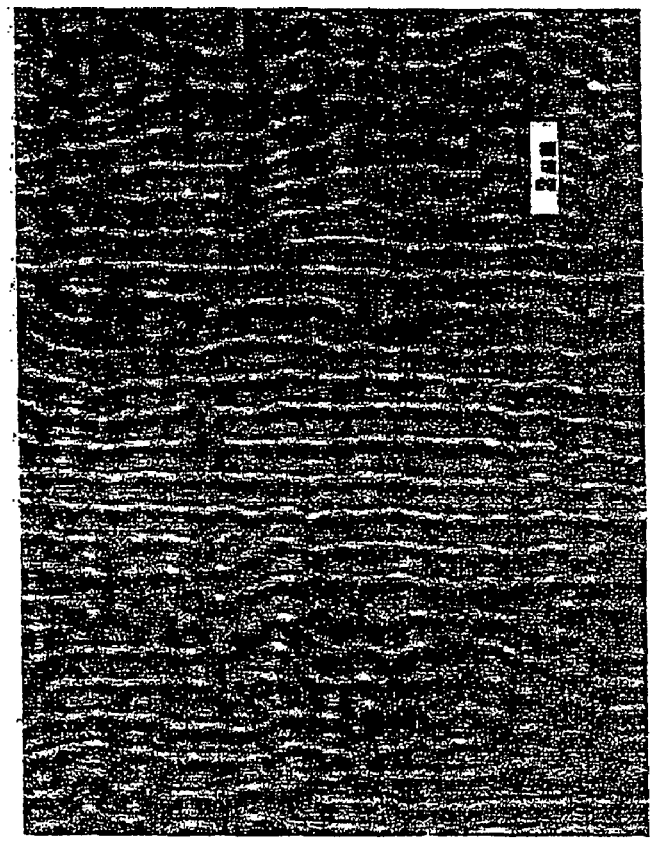

FIGS. 11(a) and 11(b) show a periodic structure formed on the copper tape at the incident angle of 45 degrees and in the feed direction L. The images of FIGS. 11(a) and 11(b) have been shot toward a same point with different focus, in which the S− type periodic structures can be clearly observed, and can also be vaguely seen when observing the S+ type periodic structure, since both of the S− and S+ type periodic structures are formed at the same position when moved in the feed direction L.

Figure 12B:
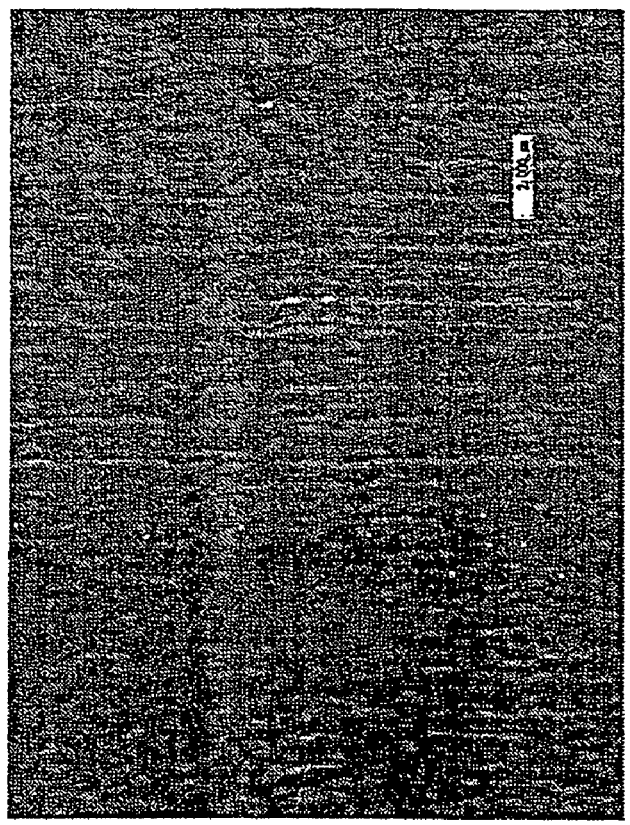
FIGS. 12(a) and 12(b) are enlarged plan views showing a periodic structure of the S− type and S+ type, respectively, formed by feeding the copper tape in the direction R.
Figure 12A:
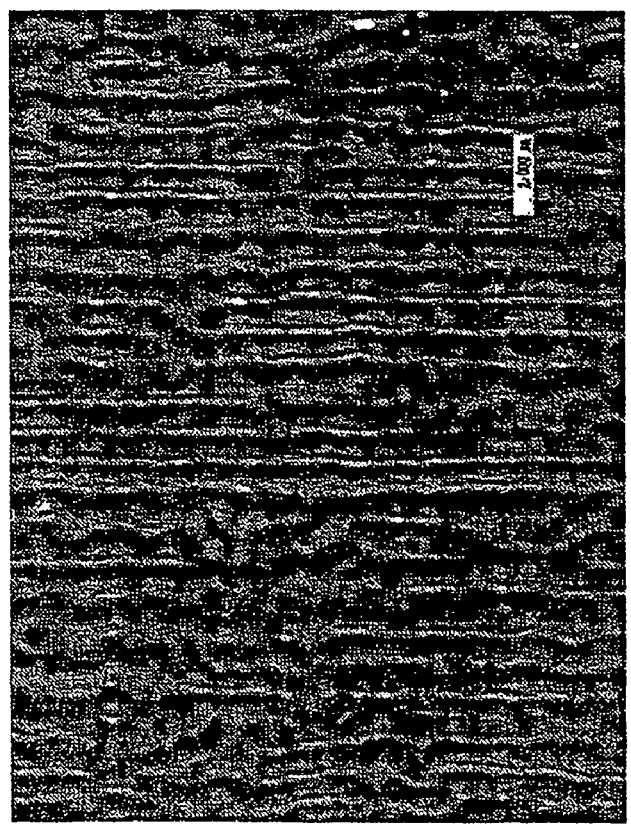

FIGS. 12(a) and 12(b) show a periodic structure formed on the copper tape at the incident angle of 45 degrees and in the feed direction R. In this feed direction R also the both types of periodic structures have been obtained, however the S– type periodic structure is often interrupted, and can barely be seen when observing the S+ type periodic structure. Accordingly, it is proven that the S– type periodic structure is more clearly formed when moved in the feed direction L.

FIG. 13 is a line graph showing a relationship between the incident angle and ripple spacing of a periodic structure formed on the silicon and the copper tape, along with theoretical values.

Figure 14B:
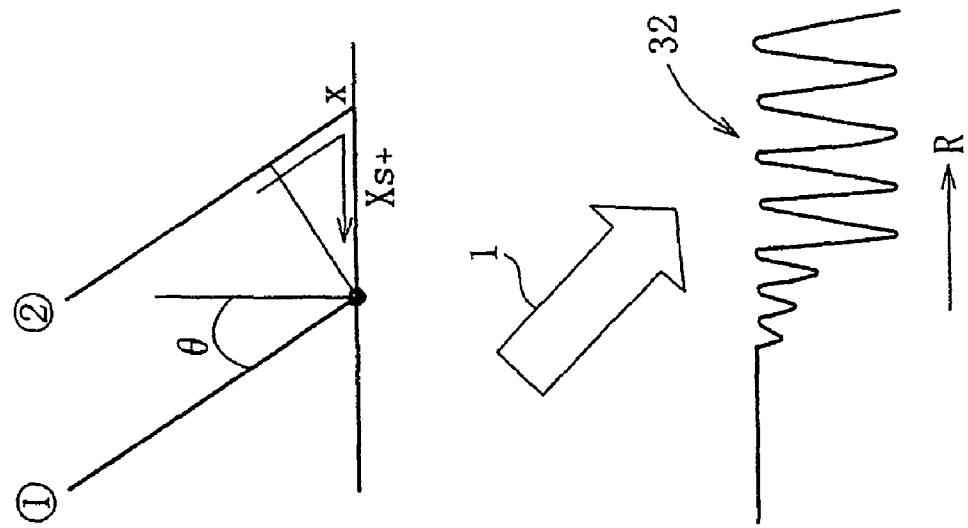
FIGS. 14(a) and 14(b) are drawings for explaining a formation mechanism of a periodic structure with the feeding direction of L and R, respectively.
Figure 14A:
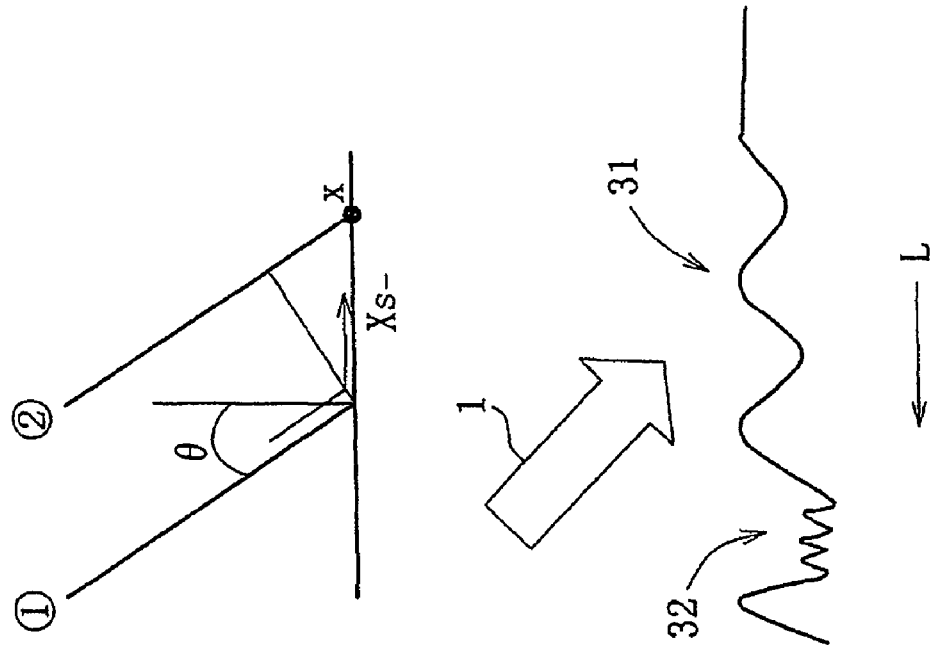

A reason that the S– type periodic structure having a wider ripple spacing is more clearly formed when moved in the feed direction L can be explained as follows. In the case of the feed direction L, the S– type periodic structure 31 is first formed on a plane surface as shown in FIG. 14(a), and the S+ type periodic structure 32 is formed so as to overlap when the specimen 2 is moved. By contrast, in the case of the feed direction R, since the S+ type periodic structure 32, which has a narrower ripple spacing, is first formed on the plane surface as shown in FIG. 14(b), there is no longer enough room for the S– type periodic structure to be clearly formed.

As a result of forming minute periodic structures utilizing the femtosecond laser beam of a fluence near the ablation threshold on the silicon, copper tape and aluminum tape as above, the following facts have been confirmed.

1. On silicon, copper and aluminum, a periodic structure can be formed over an extensive area by irradiating a uniaxial laser beam on a surface of the specimen through a cylindrical lens and performing the scanning thereon.

2. The periodic structure has an incident angle dependency, and a theoretical value of the interval is $\lambda/(1\pm\sin\theta)$.

3. The periodic structure has a scanning direction dependency, and the S– type periodic structure is more clearly formed in the feed direction L.

4. Different periodic structures are formed through a same mechanism, i.e. formed by interference between an incident beam and a surface scattered wave.

In addition, with respect to different specimens from the silicon, copper tape and aluminum tape, similar periodic structures have been obtained to those formed on the silicon, copper tape and aluminum tape.

Now description will be given on a method of surface treatment according to the present invention.

Figure 15A:
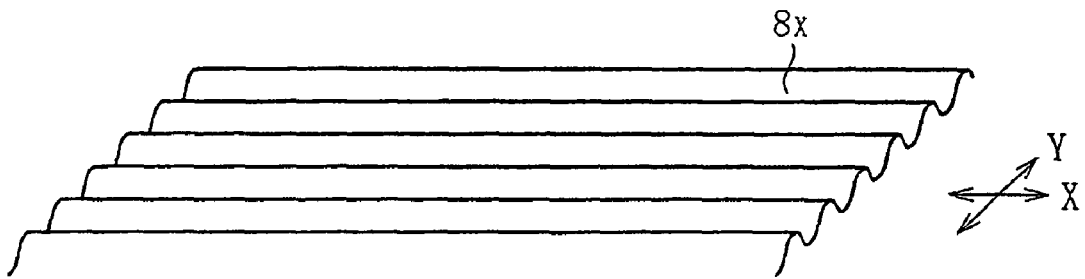
FIGS. 15(a) and 15(b) are enlarged schematic perspective views showing a periodic structure formed in an X and Y direction, respectively.
Figure 15B:
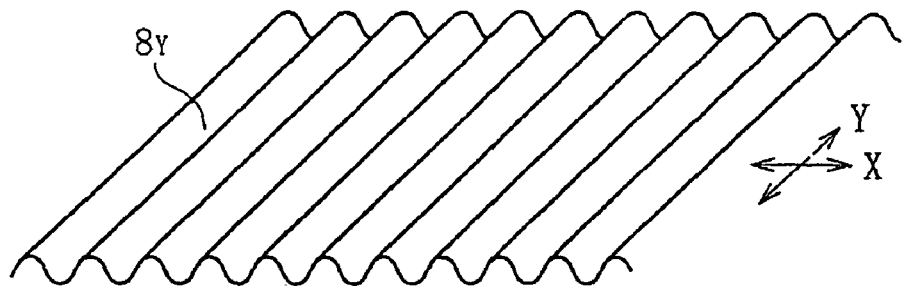

As already described in details, irradiating a laser beam on a material surface and perform a scanning with the irradiating beam leads to formation of a periodic structure, according to the present invention. Here, when a direction of polarization of the laser beam is set in a direction Y, a periodic structure $8_X$ oriented in a direction X is obtained as shown in FIG. 15(a), while setting the direction of polarization of the laser beam in the direction X results in formation of a periodic structure $8_Y$ oriented in a direction Y, as shown in FIG. 15(b).

Also, changing a direction of polarization of the laser beam allows changing a direction of the periodic structure. Based on this, in the case where, after once forming a periodic structure $8_X$ oriented in one direction as shown in FIG. 15(a) by irradiating a laser beam near an ablation threshold and executing an overlapped scanning on the irradiated region in one direction, a relative angle between the material surface and the direction of polarization of the laser beam is changed, followed by irradiation of the laser beam near the ablation threshold and overlapped scanning on the irradiated region over the periodic structure already formed so as to form a periodic structure $8_Y$ in a different direction, a composite grating structure $8_Z$ overlapped in a different direction can be formed.

Figure 15C:
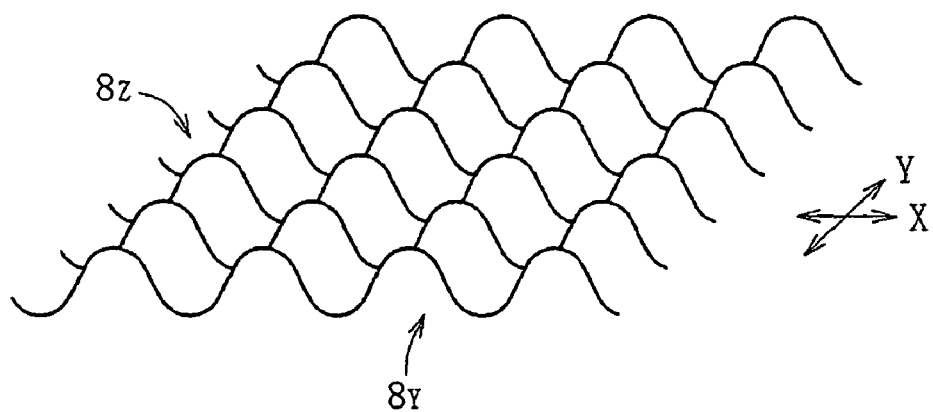
FIG. 15(c) is an enlarged schematic perspective view showing a composite type periodic structure formed so as to overlap in X and Y directions.

Accordingly, changing the relative angle between the material surface and the direction of polarization of the laser beam by 90 degrees as shown in FIG. 15(c), when forming the latter periodic structure, results in formation of a check patterned periodic structure $8_Z$, and changing the relative angle between the material surface and the direction of polarization of the laser beam by a desired angle other than 90 degrees leads to formation of a bias check patterned periodic structure.

Figure 15D:
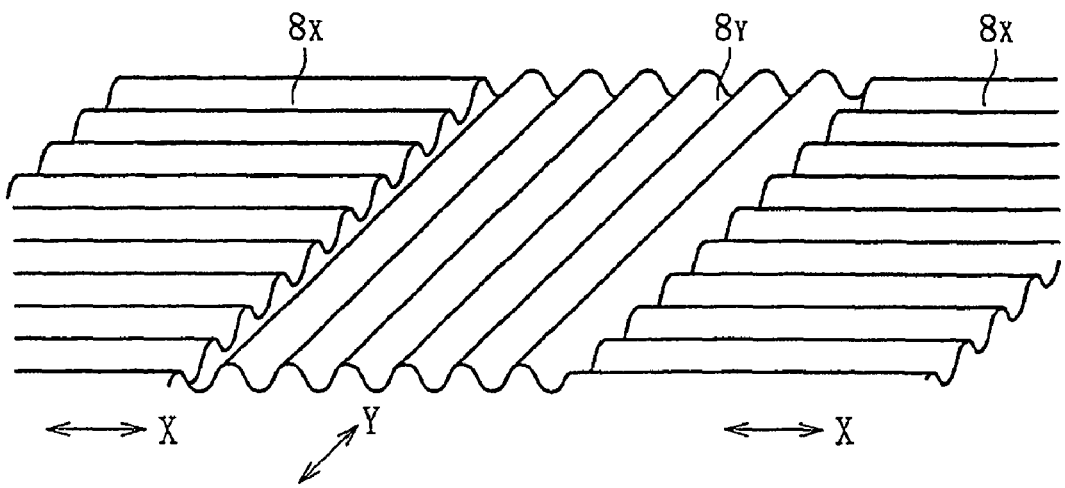
FIG. 15(d) is an enlarged schematic perspective view showing a periodic structure formed in X and Y directions in a mixed layout.

Referring now to FIG. 15(d), in the case where, after once forming a periodic structure $8_X$ in one direction by irradiating a laser beam near an ablation threshold and executing an overlapped scanning on the irradiated region in one direction, a relative angle between the material surface and the direction of polarization of the laser beam is changed, followed by irradiation of the laser beam near the ablation threshold on a region adjacent to or spaced from the periodic structure $8_X$ already formed and overlapped scanning on the newly irradiated region, another periodic structure $8_Y$ can be formed in a different direction in the region adjacent to or spaced from the first formed periodic structure $8_X$. Accordingly, changing the relative angle between the material surface and the direction of polarization of the laser beam by 90 degrees, when forming the latter periodic structure, results in formation of a periodic structure $8_X$ in an X direction and the other $8_Y$ in a Y direction, disposed in a mixed layout, and changing the relative angle between the material surface and the direction of polarization of the laser beam by a desired angle other than 90 degrees leads to formation of the periodic structures oriented in different directions and disposed in a mixed layout.

Figure 16:
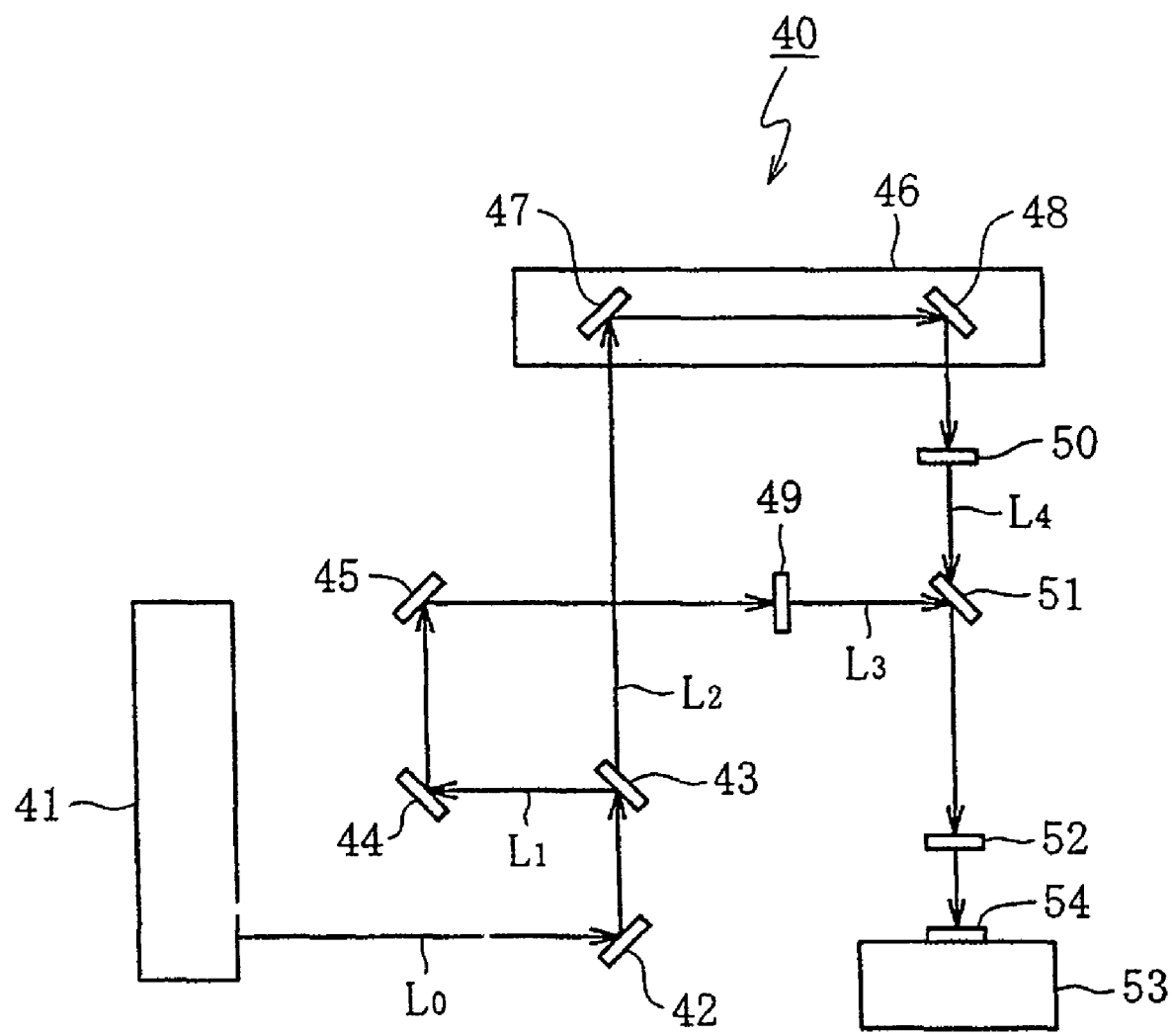
FIG. 16 is a schematic diagram showing a configuration of a periodic structure forming apparatus that forms a periodic structure oriented in different directions at a time.

Also as already stated, based on the fact that changing the direction of polarization of the laser beam leads to a change in the orientation of the periodic structure, a grating structure overlapped in different directions as shown in FIG. 15(c) can be formed through one process utilizing a periodic structure forming apparatus 40 as shown in FIG. 16. The periodic structure forming apparatus 40 of FIG. 16 emits a laser beam $L_0$ generated by a titanium-sapphire laser generator 41, so that the laser beam $L_0$ is totally reflected by a mirror 42, and split by a half mirror 43 into a reflected laser beam $L_1$ and a transmitted laser beam $L_2$. Then the reflected laser beam $L_1$ is totally reflected by mirrors 44, 45, so as to produce an optical delay 46 on the transmitted laser beam $L_2$. This optical delay 46 includes mirrors 47, 48. Laser beams $L_3$, $L_4$ produced by polarizing the laser beams $L_1$, $L_2$ with polarizer 49, 50 are provided to a half mirror 51, so that the half mirror 51 merges the polarized laser beams $L_3$, $L_4$ and irradiates through a lens 52 to a surface of a material 54 set on an X-Y table 53. In this way, the laser beams $L_3$, $L_4$ near the ablation threshold having a plurality of pulses and different directions of polarization can be irradiated to the surface of the material 54 at a determined time interval. Then executing an overlapped scanning over the irradiated region results in spontaneous and simultaneous formation of a periodic structure $8_Z$ overlapped in different directions as shown in FIG. 15(c).

Accordingly, for example, irradiating the laser beams $L_3$, $L_4$ near the ablation threshold having a plurality of pulses and directions of polarization that are different by 90 degrees at a predetermined time interval, and executing an overlapped scanning over the irradiated region, results in spontaneous and simultaneous formation of a check patterned periodic structure $8_Z$ as shown in FIG. 15(c), in which the periodic structure $8_X$ oriented in an X direction and the periodic structure $8_Y$ oriented in a Y direction which is orthogonal to the X direction are overlapping. Also, irradiating laser beams near an ablation threshold having a plurality of pulses and directions of polarization that are different by a desired angle other than 90 degrees at a predetermined time interval, and executing an overlapped scanning over the irradiated region, results in spontaneous and simultaneous formation of a bias check patterned grating structure intersecting in the desired angle other than 90 degrees.

Descriptions will now be made on changes in surface characteristics of materials resultant from the formation of the periodic structure. As a material for examining the surface characteristics, a silicon having a thickness of 50 μm was employed. For irradiation, a titanium-sapphire laser beam, for example having a pulse width of 120 fs, center wavelength of 800 nm, repetition frequency of 1 kHz, pulse energy of 100 μJ/pulse was expanded by a beam expander and condensed by a cylindrical lens. Such laser beam was irradiated on the silicon surface, and an overlapped scanning was performed on the irradiated region, at a scanning speed of 0.25 mm/s. As a result, a periodic structure of 0.7 μm in ripple spacing and 0.2 μm in depth has been formed.

Upon comparing a fine particle (glass particle of 20 μm in diameter) adhesion characteristic of the silicon surface where such periodic structure has been formed, with the fine particle adhesion characteristic of a mirror-surfaced silicon, a result shown in table 1 has been obtained.

TABLE 1

Inhibition of fine particle adhesion

|  | The present invention | Mirror surface |
| --- | --- | --- |
| Area | 115 mm$^2$ | 68.5 mm$^2$ |
| Number of particles adhered | 0 | 260 |
| Adhesion density | 0/mm$^2$ | 3.8/mm$^2$ |

In view of the table 1, which evidently shows the inhibition effect provided by the periodic structure agaisnt fine particle adhesion on the silicon surface, it is obvious that a pull-off force has been reduced. In a micromachine, since a weight of itself is extremely small, the pull-off force exerts a dominant influence over a friction force. Since forming a periodic structure according to the present invention reduces the pull-off force, it becomes possible to reduce a friction force of a micromachine. Also, the reduction of a friction force results in reduction of friction wear.

Further, in addition to micromachines, the present invention can be suitable applied to precision parts such as a crank shaft or piston ring of an automobile engine, for reduction of friction and friction wear on a surface of those parts, because the periodic structure has the functions of retaining and supplementing the lubricant, granting capability of forming a fluid film, and preventing adhesion of worn powder.

WORKING EXAMPLE

An effect of the periodic structure according to the present invention to sliding characteristic will be described as under.

Figure 17:
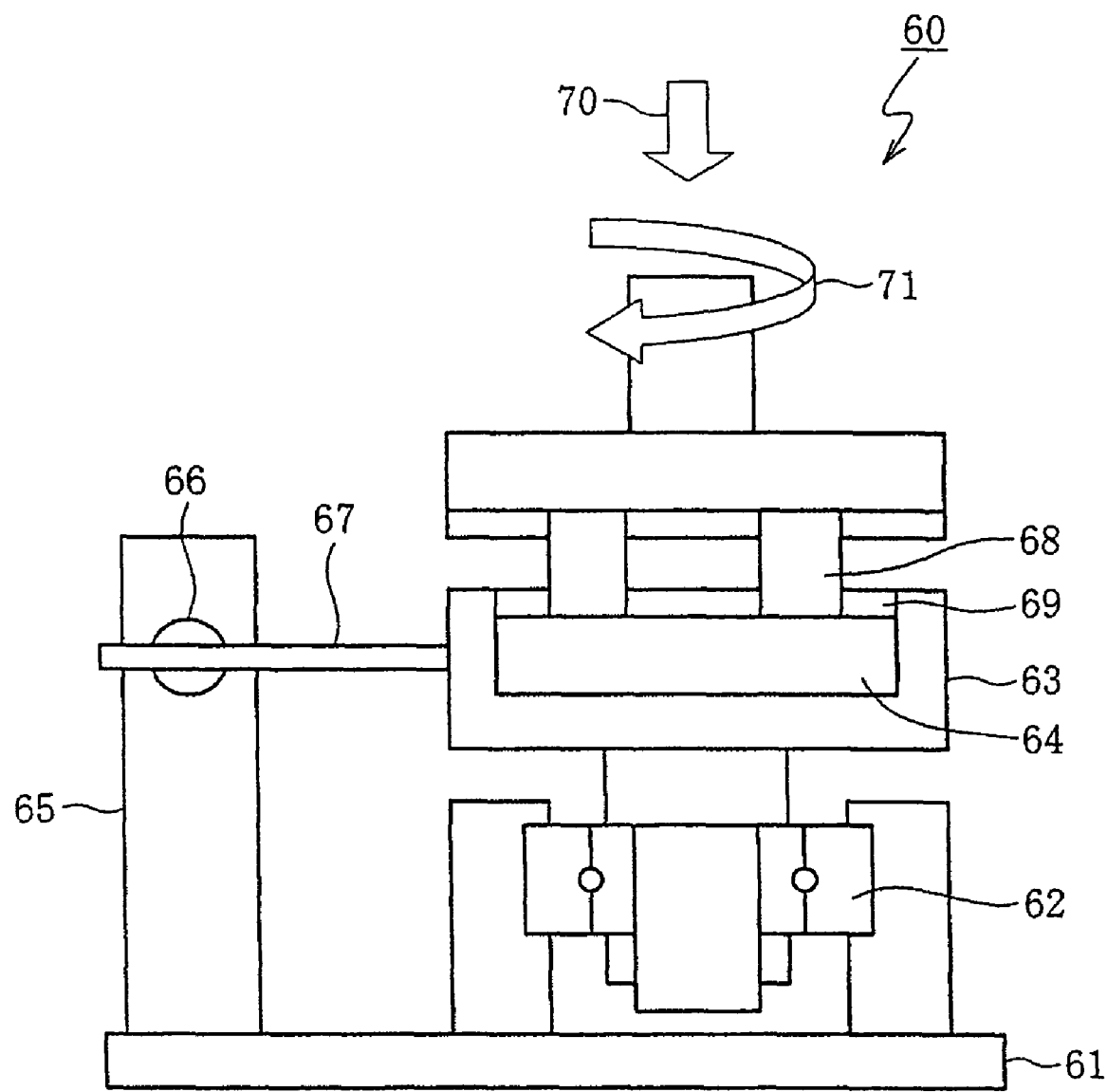
FIG. 17 is a schematic side view showing a rotational sliding test apparatus.

FIG. 17 is a schematic side view showing a sliding test apparatus 60, employed for sliding tests of disc-shaped test pieces on which the foregoing periodic structures are provided. The sliding test apparatus 60 includes a base 61 rotatably supporting a test piece table 63 via a bearing 62, and the test piece table 63 is provided with a recessed portion for retaining a fixed test piece 64 therein. On the base 61, also a pillar 65 is erected, on which a load cell 66 is disposed such that a rotating torque of the test piece table 63 is applied thereto via a cantilever 67. Further, a rotating test piece 68 is disposed so as to oppose the fixed test piece 64, and pure water 69 is filled in the recessed portion of the test piece table 63, so that the pure water 69 is interposed between sliding surfaces of the fixed test piece 64 and the rotating test piece 68. A load 70 is applied to the rotating test piece 68, and a rotative driver (not shown) causes a rotating motion 71.

Figure 18A:
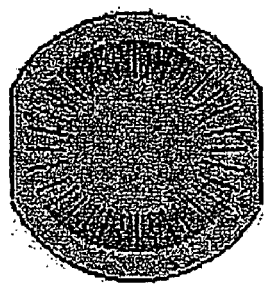
FIGS. 18(a) to 18(d) are plan views respectively showing a periodic structure of a radial pattern, a concentric circle pattern, a first spiral pattern and a second spiral pattern.
Figure 18B:
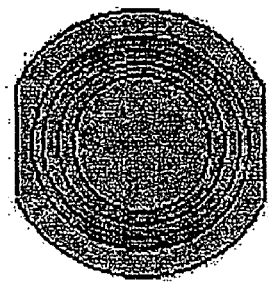
Figure 18C:
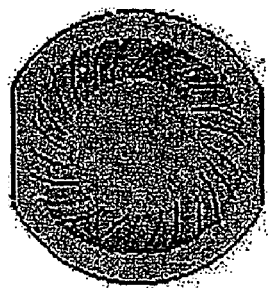
Figure 18D:
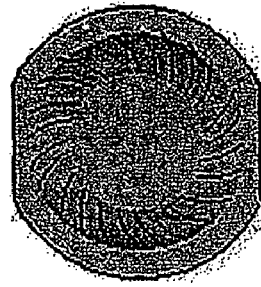

The disc-shaped test pieces are made of an ultra-hard alloy, on which various ring-shaped periodic structures have been formed as shown in FIGS. 18(a) to 18(d). FIG. 18(d) shows a radial periodic structure, FIG. 18(b) shows a concentric circle pattern radial periodic structure, FIG. 18(c) shows a first spiral periodic structure, and FIG. 18(d) shows a second spiral periodic structure. The first spiral periodic structure of FIG. 18(c) and the second spiral periodic structure of FIG. 18(d) are different in the direction (angle) of the spiral pattern.

As the rotating test piece 68, a hardened stainless steel according to SUS440C was employed, while an ultra-hard alloy was employed as the fixed test piece 64. Surface roughness of the respective test pieces were set at Rmax 0.05 μm or lower, and flatness of 1 band or less by an optical flat and red LED. On the surface of the fixed test pieces 64, the four patterns of periodic structure have been formed in an annular region having an inner diameter of 9.75 mm and an outer diameter of 16.25 mm. Depth of grooves is approx. 0.2 μm, and the groove angle of the spiral is 45 degrees with respect to a radius.

One of the rotating test pieces 68 is of a ring shape having an inner diameter of 10 mm and an outer diameter of 16 mm, with a mirror surface of the above precision, and the other is of a disc shape having an outer diameter of 16 mm, with both of which ring/disc tests and disc/disc tests simulating a thrust bearing were performed. A sliding test of mirror surfaces was also performed for comparison purpose. All the tests were performed in a clean booth (corresponding to class 100) at a room temperature of 23 degree centigrade, and the test pieces were ultrasonically cleaned with ethanol and pure water.

Figure 19:
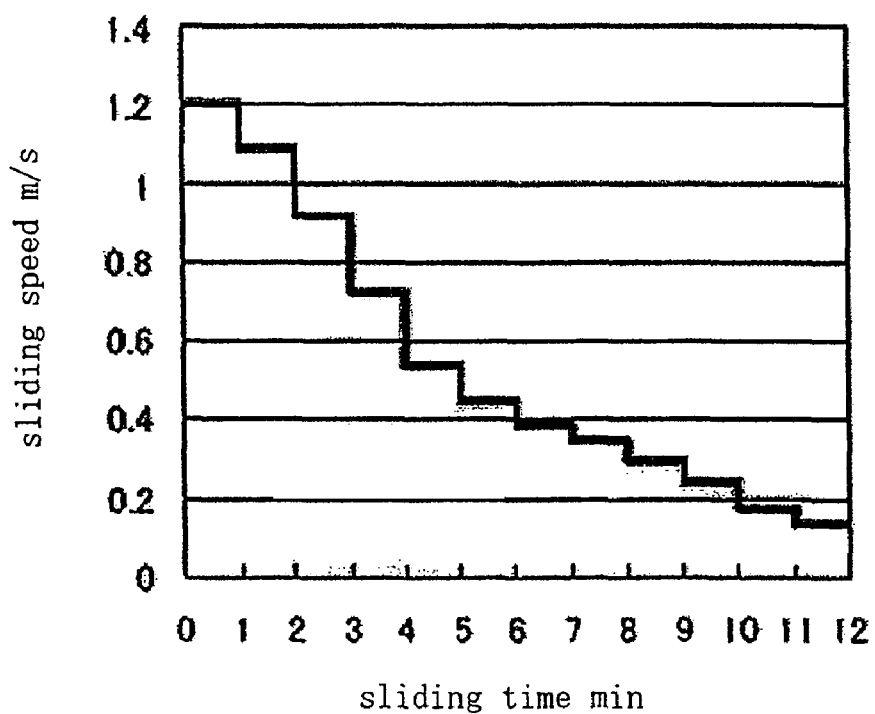
FIG. 19 is a line graph showing a variation characteristic of a sliding speed utilized in the rotational sliding test.

The load was constantly set at 10N, and the sliding speed was gradually reduced from 1.2 m/s to 0.15 m/s every minute. FIG. 19 shows a changing pattern of the sliding speed on the part of the rotating test piece 68. Here, the sliding speed is taken at a position corresponding to an average diameter of 13 mm on the rotating test piece 68 employed in formation of the ring-shaped periodic structure and the ring/disc sliding test. Thus, on the sliding test apparatus 60 according to FIG. 17, the sliding (rotating) speed of the rotating test piece 68 was reduced with the lapse of time, so that a change of friction coefficient between the fixed test piece 64 and the rotating test piece 68 could be more clearly recognized.

After the test, a friction coefficient μ has been worked out based on a sliding torque, by the following formula 3.

$$\mu = \frac{M}{Wr}$$ [Formula 3]

where M represents a sliding torque, and W a load. The "r" represents an average radius of 6.5 mm, of the rotating test pieces 68 employed for formation of the ring-shaped periodic structure and the ring/disc tests. Although applying the formula 3 based on r of 6.5 mm in the disc/disc test does not make sense from a viewpoint of physics, the value of r=6.5 mm has been utilized for easier understanding of an effect in a central portion of the rotating test piece 68 in comparison with the result of the ring/disc tests.

[Test Result]

[Ring/Disc Test]

FIGS. 20(*a*) to 20D are line graphs showing a sliding test result in which the fixed test pieces having the minor surface (20(*a*)), a periodic structure of the radial pattern (20(*b*)), a periodic structure of the concentric circle pattern (20(*a*)) and a periodic structure of the first spiral pattern (20(*d*)) were respectively used.

In the case of the test piece with the minor surface of FIG. 20(*a*), the friction coefficient sharply increased immediately upon starting the sliding test. With respect to the test piece having the radial pattern periodic structure of FIG. 20(*b*), the friction coefficient significantly decreased in comparison with the test piece with the mirror surface. With respect to the test piece having the concentric circle pattern periodic structure as FIG. 20(*c*), a visible fluid lubrication region has not been observed. In the case of the first spiral pattern periodic structure as FIG. 20(*d*), an intermediate characteristic between the radial pattern periodic structure and the concentric circle periodic structure has been observed, in the aspects of the fluid lubrication region and conformability in mixed lubrication. With respect to the test piece with the second spiral periodic structure, since the pattern serves as a pump to discharge the pure water from a central portion toward a peripheral portion because of the sliding motion, the friction coefficient suddenly increased up to higher than 0.5 once the pure water was completely discharged.

Figure 20A:
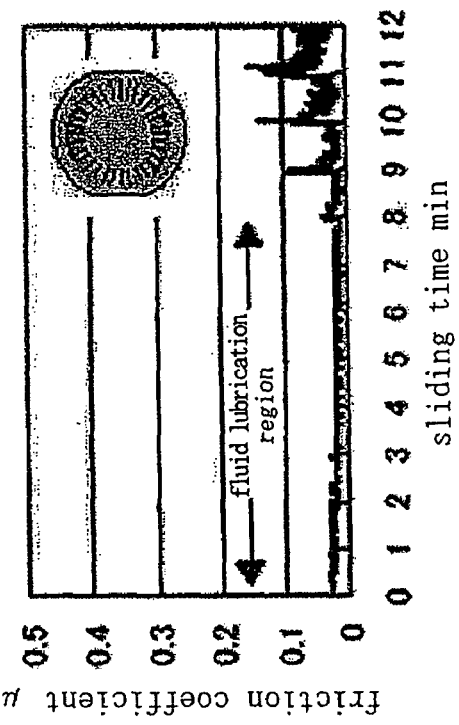
FIGS. 20(a) to 20(d) are line graphs showing a sliding speed and a friction coefficient characteristics obtained through the sliding tests, with respect to sliding between mirror surfaces, between the radial pattern and the minor surface, between the concentric circle pattern and the mirror surface, and between the spiral 1 pattern and the minor surface, respectively.
Figure 20C:
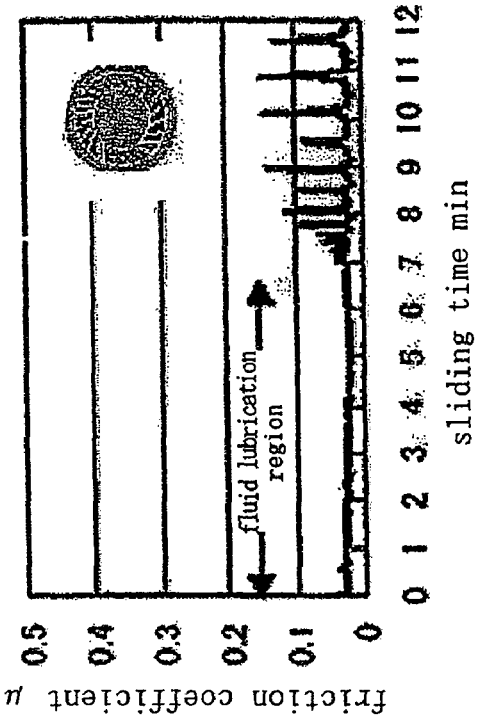
Figure 20B:
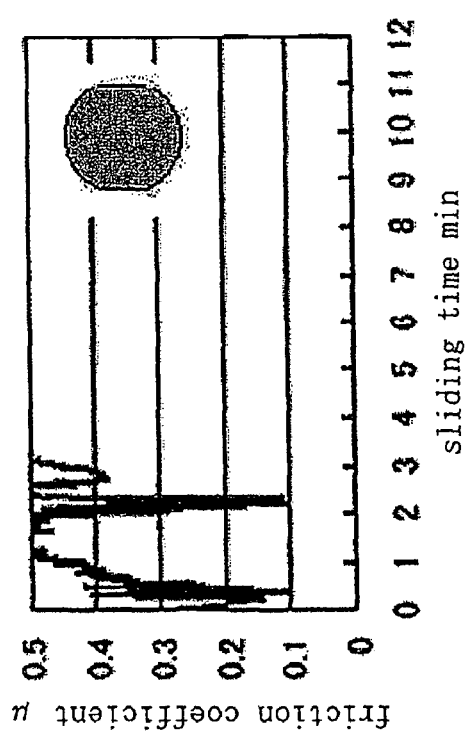
Figure 20D:
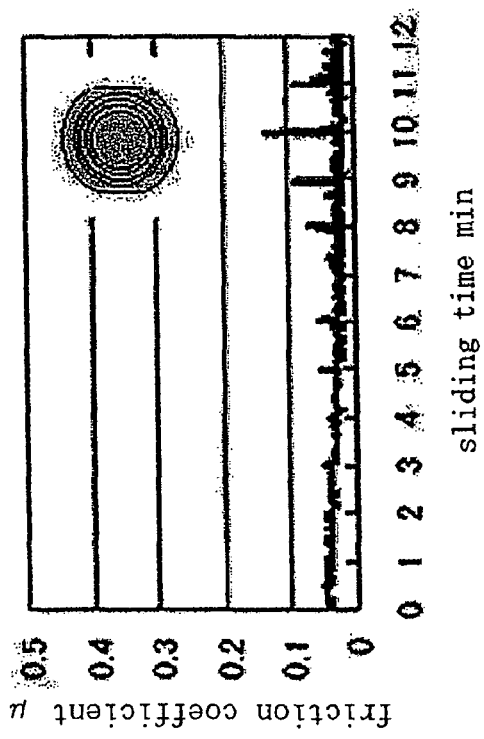

In the case of the test piece with the mirror surface of FIG. 20A, the friction coefficient sharply increased immediately upon starting the sliding test. With respect to the test piece having the radial pattern periodic structure of FIG. 20B, the friction coefficient significantly decreased in comparison with the test piece with the mirror surface. With respect to the test piece having the concentric circle pattern periodic structure as FIG. 20C, a visible fluid lubrication region has not been observed. In the case of the first spiral pattern periodic structure as FIG. 20D, an intermediate characteristic between the radial pattern periodic structure and the concentric circle periodic structure has been observed, in the aspects of the fluid lubrication region and conformability in mixed lubrication. With respect to the test piece with the second spiral periodic structure, since the pattern serves as a pump to discharge the pure water from a central portion toward a peripheral portion because of the sliding motion, the friction coefficient suddenly increased up to higher than 0.5 once the pure water was completely discharged.

Figure 21A:
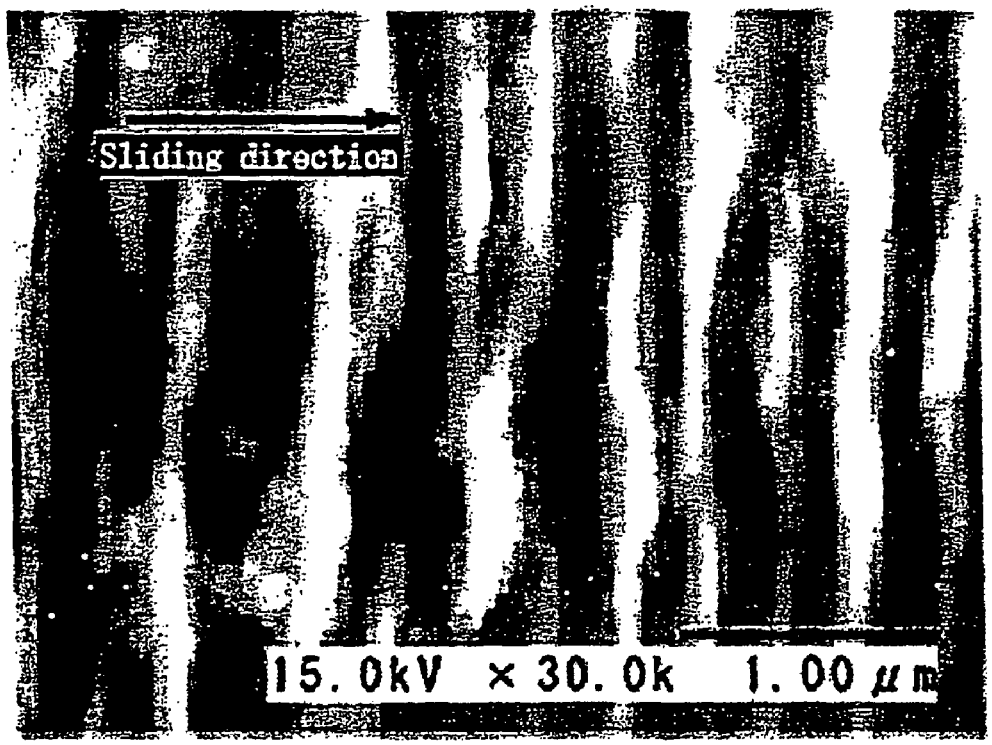
FIGS. 21(a) and 21(b) are plan views showing a periodic structure of the radial pattern and the concentric circle pattern, respectively, with a friction wear after a loaded sliding test.
Figure 21B:
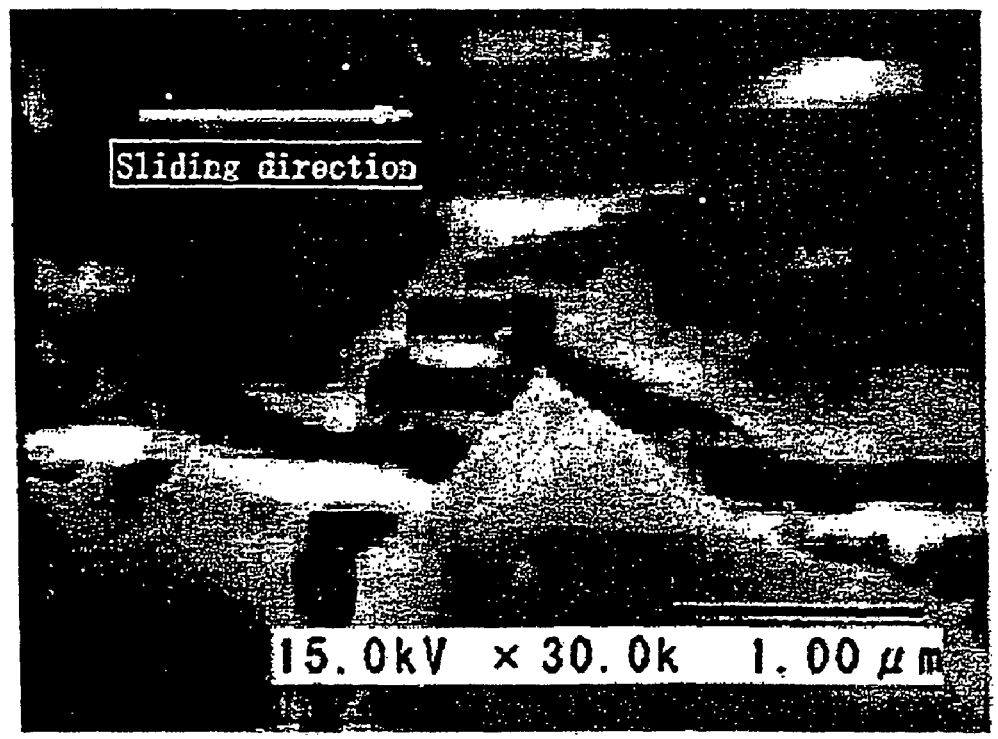

For evaluating discharging capability of worn powder, the load was increased to 100N, which is ten times as great as the load of an ordinary test, under which traces of wear were formed on the periodic structures, and observation thereof was performed. FIG. 21(*a*) shows a state of the radial pattern periodic structure, and FIG. 21(*b*) that of the concentric circle periodic structure. While the radial pattern periodic structure has been fully filled with the worn powder, grooves of the concentric circle periodic structure still remain uncovered with the worn powder, though scale-shaped worn particles are formed on the periodic structure.

Figure 22A:
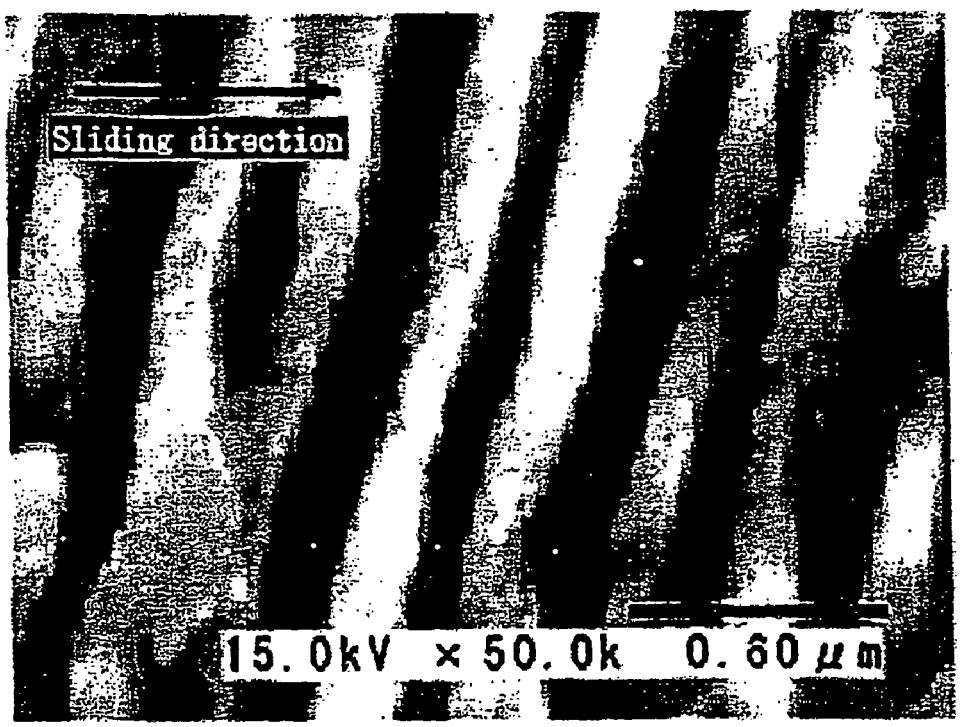
FIGS. 22(a) and 22(b) are plan views showing a periodic structure of the radial pattern and the concentric circle pattern, respectively, where a friction wear is not caused after a loaded sliding test.
Figure 22B:
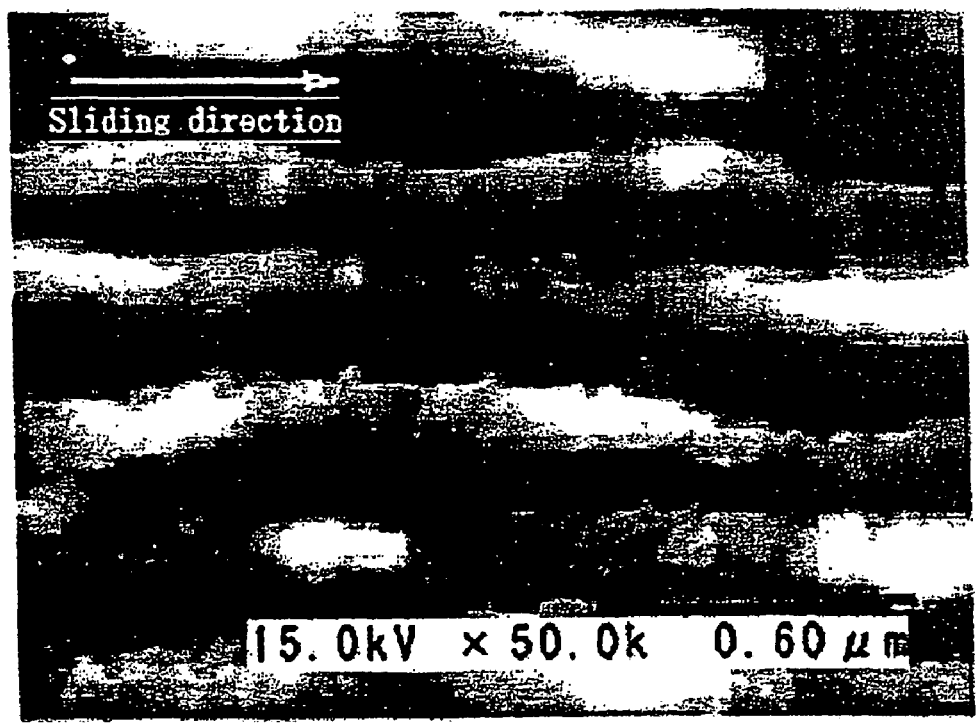

FIGS. 22(*a*) and 22(*b*) show a state of the periodic structure of the same test pieces as FIGS. 21(*a*) and 21(*b*), but at a portion where the trace of wear is not produced. On the radial pattern periodic structure of FIG. 22(*a*) not much worn powder is observed, while a multitude of worn powders of approx. 100 nm is stuck on the concentric circle periodic structure of FIG. 22(*b*). In view of this, it is understood that the worn waste has barely moved from where it was produced in the radial pattern periodic structure, while the worn powder is discharged with the fluid by the grooves on the concentric circle periodic structure.

[Disc/Disc Test]

Figure 23A:
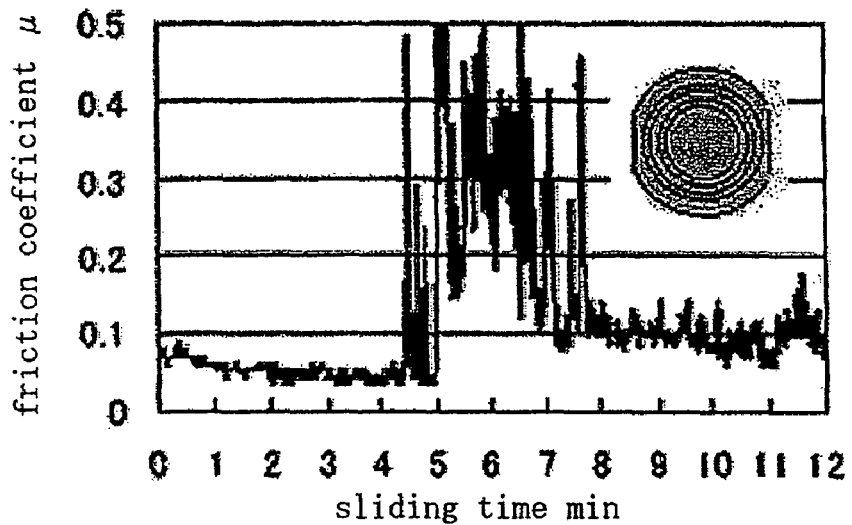
FIGS. 23(a) to 23(c) are line graphs showing a sliding speed and a friction coefficient characteristics obtained through a disc/disc sliding test, with respect to a disc having a concentric circle pattern (23(a)), a radial pattern (23(b)), and a first spiral pattern (23(c)), respectively.
Figure 23B:
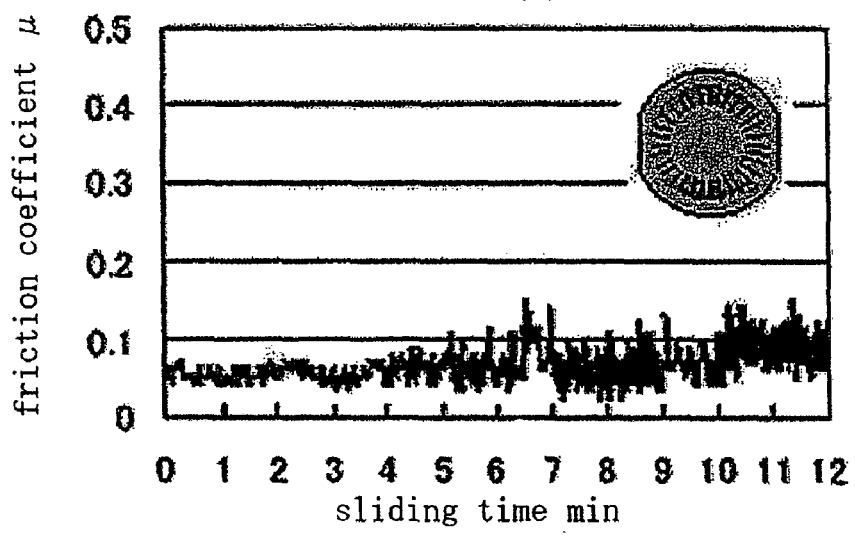
Figure 23C:
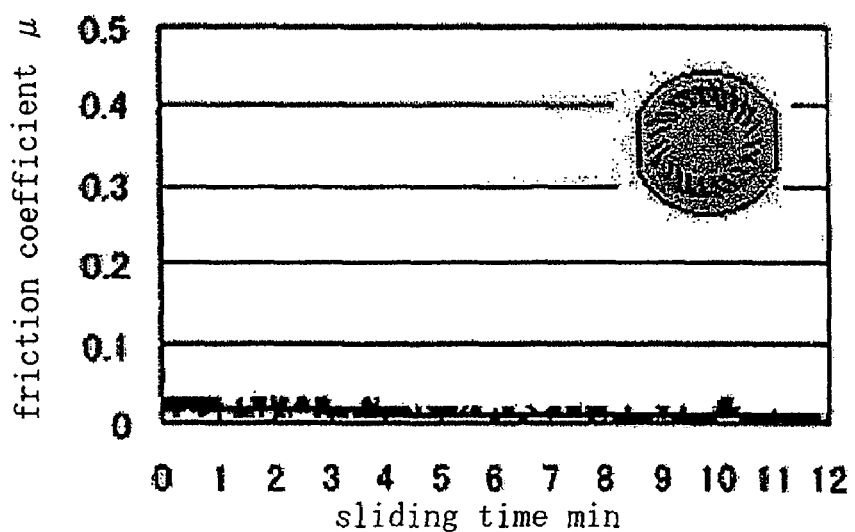

FIGS. 23(*a*) to 23(*c*) are line graphs showing changes in friction coefficient of the test pieces having the concentric circle periodic structure (23(*a*)), the radial pattern periodic structure (23(*b*)), and the first spiral pattern periodic structure (23(*c*)), respectively. In all these test samples, mutual sliding of the minor surfaces takes place in a central portion thereof. However with respect to the concentric circle periodic structure in particular, which does not practically produce a load capacity, the greatest friction coefficient was presented since a sliding friction readily takes place.

Based on the test result with respect to the foregoing periodic structures, the following conclusions have been reached.

1. A periodic structure having a sub-micron interval and groove depth spontaneously formed by irradiation of a femtosecond laser beam significantly reduces a friction coefficient.

2. A radial pattern periodic structure can improve a load capadity of a fluid lubrication film, and presents a fluid lubrication region in a broadest condition range at a ring/disc sliding test.

3. A concentric circle periodic structure has a prominent worn powder discharging capability and prevents adhesion of the worn powder, and therefore shows a lowest friction coefficient in a mixed lubrication region at a ring/disc sliding test.

4. A spiral pattern periodic structure also can improve a load capacity of a fluid lubrication film, and presents a fluid lubrication region in a broadest condition range at a disc/disc sliding test.

What is claimed is:

1. A method of forming a periodic structure, comprising:

irradiating a surface of a material with a linearly polarized single laser beam of a femtosecond laser, of which a fluence is above but nearly as low as ablation threshold; and executing an overlapped scanning in which the laser beam is scanned on the material surface with a laser scanning speed being set such that the number of pulses of the laser beam irradiated on an identical position of the material surface is within a range of 10 to 300, so as to cause the ablation on the material surface at a section where interference has taken place between a p-polarization component of an incident beam and a p-polarization component of a surface scattered wave generated along the material surface, and to thereby form a periodic structure on the material surface, wherein the periodic structure has ripples spacing near a wavelength of the incident beam in a direction perpendicular to a polarization direction of the incident beam.

2. The method according to claim 1, wherein the step of irradiating the laser beam includes changing an incident angle of the laser beam to the material surface, to thereby change a ripple spacing of the periodic structure.

3. The method according to claim 1, wherein the step of irradiating the laser beam includes irradiating the laser beam at an incident angle, and the step of executing the overlapped scanning includes changing a scanning direction of the laser beam so as to change the periodic structure.

4. The method according to claim 1, wherein the step of irradiating the laser beam includes changing a direction of polarization so as to change a direction of the periodic structure.

5. The method according to claim 1, further comprising utilizing a beam expander either with or without a cylindrical lens, thus expanding the laser beam to irradiate a more extensive area.

6. The method according to claim 1, wherein the periodic structures in different directions are formed on the material surface in state of overlapping each other.

7. The method according to claim 1, wherein the periodic structures in different directions are formed on the material surface in state of being adjacent to or spaced from each other.

8. The method according to claim 6, wherein the laser beam is split into two laser beams having a different direction of polarization to each other, and wherein the laser beams are irradiated on the material surface at a predetermined time interval such that the laser beams do not overlap each other.

9. The method according to claim 7, wherein the direction of polarization of the laser beam is changed during the scanning.

10. The method according to claim 1, wherein the laser beam is condensed by a cylindrical lens.

11. The method according to claim 1, wherein the material surface formed with the periodic structure has characteristics including dust proofness and inhibition of particle adhesion.

12. The method according to claim 1, wherein the material surface formed with the periodic structure has characteristics including reduction of friction and friction wear.

13. The method according to claim 1, wherein the material surface formed with the periodic structure has characteristics including reduction of wettability.

* * * * *